US011021604B2

(12) United States Patent  
Okamoto et al.

(10) Patent No.: US 11,021,604 B2
(45) Date of Patent: Jun. 1, 2021

(54) POLYCARBONATE RESIN COMPOSITION AND MOLDED OBJECT OF SAME

(71) Applicant: IDEMITSU KOSAN CO., LTD., Tokyo (JP)

(72) Inventors: Yoshio Okamoto, Chiba (JP); Tsuyoshi Murakami, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 15/751,234

(22) PCT Filed: Aug. 2, 2016

(86) PCT No.: PCT/JP2016/072636
§ 371 (c)(1),
(2) Date: Feb. 8, 2018

(87) PCT Pub. No.: WO2017/026325
PCT Pub. Date: Feb. 16, 2017

(65) Prior Publication Data
US 2018/0230305 A1    Aug. 16, 2018

(30) Foreign Application Priority Data

Aug. 12, 2015  (JP) .............................. JP2015-159587

(51) Int. Cl.
*C08L 69/00* (2006.01)
*C08G 77/448* (2006.01)
*C08L 33/12* (2006.01)
*C08L 55/02* (2006.01)
*C08K 5/521* (2006.01)

(52) U.S. Cl.
CPC ............ *C08L 69/00* (2013.01); *C08G 77/448* (2013.01); *C08L 33/12* (2013.01); *C08K 5/521* (2013.01); *C08L 55/02* (2013.01); *C08L 2201/02* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| 6,545,089 B1 | 4/2003 | DeRudder et al. | |
| 2002/0193476 A1* | 12/2002 | Mitsuta ................ | C08K 5/49 524/115 |
| 2009/0036593 A1* | 2/2009 | DeRudder ............. | C08L 55/02 524/506 |
| 2010/0016489 A1* | 1/2010 | Nagatoshi ............. | C08L 69/00 524/405 |
| 2011/0207846 A1* | 8/2011 | Monden ................ | C08L 69/00 523/134 |
| 2014/0303296 A1* | 10/2014 | Inazawa ................ | C08L 27/18 524/127 |
| 2015/0166733 A1 | 6/2015 | Nagao et al. | |
| 2015/0210854 A1 | 7/2015 | Aoki | |
| 2016/0355678 A1 | 12/2016 | Murakami et al. | |

FOREIGN PATENT DOCUMENTS

| CN | 1218070 A | 6/1999 |
| CN | 101809085 A | 8/2010 |
| CN | 103958607 A | 7/2014 |
| CN | 106133057 A | 11/2016 |
| JP | 04-285655 A | 10/1992 |
| JP | H05-070677 A | 3/1993 |
| JP | 06-287430 A | 10/1994 |
| JP | 2000-191898 A | 7/2000 |
| JP | 2000-226504 A | 8/2000 |
| JP | 2001-055500 A | 2/2001 |
| JP | 2001-302898 A | 10/2001 |
| JP | 2004-027112 A | 1/2004 |
| JP | 2004-035587 A | 2/2004 |
| JP | 2006008776 A | 1/2006 |
| JP | 2006-052401 A | 2/2006 |
| JP | 2006-199743 A | 8/2006 |
| JP | 2008-516013 A | 5/2008 |

(Continued)

OTHER PUBLICATIONS

UL94 Specification, Jul. 10, 1998. (Year: 1998).*
International Search Report issued in International Patent Application No. PCT/JP2016/072636 dated Aug. 30, 2016.
Chinese Office Action dated Oct. 12, 2019 for corresponding Application No. 201680046743.X.
Japanese Office Action dated Jan. 5, 2016 for corresponding Application No. 2015-159587.
Taiwanese Office Action dated Jan. 16, 2020 for corresponding Application No. 105125034.
Office Action dated Mar. 11, 2020 for corresponding Indian Patent Application No. 201847004769.
Japanese Office Action dated Jan. 5, 2020 for corresponding Application No. 2015-159587.
Office Action dated Jul. 23, 2020 for corresponding Chinese Patent Application No. 201680046743.X.

* cited by examiner

*Primary Examiner* — Christopher M Rodd
(74) *Attorney, Agent, or Firm* — Foley & Lardner LLP

(57) ABSTRACT

Provided is a polycarbonate resin composition, including: a polycarbonate resin (A) containing a polycarbonate-polyorganosiloxane copolymer (A-1) having a specific structure; a copolymer (B) having constituent units derived from acrylonitrile and styrene, and being free of a constituent unit derived from methyl methacrylate; and a copolymer (C) having constituent units derived from butadiene and methyl methacrylate, in which: a content of the polyorganosiloxane block moiety in the entire resin composition is from 0.1 mass % to 10 mass %; a total of a content of the constituent unit derived from the acrylonitrile in the entire resin composition and a content of the constituent unit derived from the styrene in the entire resin composition is from 8 mass % to 45 mass %; a content of the constituent unit derived from the butadiene in the entire resin composition is from 3 mass % to 10 mass %; and the (A) has a viscosity-average molecular weight (Mv) of from 20,000 to 25,000.

13 Claims, No Drawings

(56) References Cited

FOREIGN PATENT DOCUMENTS

| | | |
|---|---|---|
| JP | 2009-203269 A | 9/2009 |
| JP | 2014-015498 A | 1/2014 |
| TW | 201331293 A | 8/2013 |
| TW | 201410747 A | 3/2014 |
| TW | 201420673 A | 6/2014 |
| WO | WO-2013/081161 A1 | 6/2013 |
| WO | WO-2013081161 A1 * | 6/2013 ............... C08K 3/34 |
| WO | WO-2015/029841 A1 | 3/2015 |
| WO | WO-2015/122493 A1 | 8/2015 |

POLYCARBONATE RESIN COMPOSITION AND MOLDED OBJECT OF SAME

RELATED APPLICATIONS

The present application claims priority under 35 USC 371 to International Patent Application number PCT/JP2016/072636, filed Aug. 2, 2016, which claims priority to Japanese Patent Application No. 2015-159587, filed Aug. 12, 2015. The contents of these applications are hereby incorporated by reference in their entireties.

TECHNICAL FIELD

The present invention relates to a polycarbonate resin composition and a molded body thereof.

BACKGROUND ART

A polycarbonate-polyorganosiloxane polymer (hereinafter sometimes referred to as "PC-POS") has been attracting attention because of its excellent properties such as high impact resistance, chemical resistance, and flame retardancy. Accordingly, a polycarbonate resin composition containing the PC-POS has been expected to be widely utilized in various fields such as the field of electrical equipment, the field of electronic equipment, and the field of automobiles. In particular, the utilization of the polycarbonate resin composition containing the PC-POS in housings for a cellular phone, a mobile personal computer, a digital camera, a video camera, an electric tool, and the like, and in other commodities has been expanding.

In the polycarbonate resin composition containing the PC-POS, investigations have been made on further improvements in impact resistance and flame retardancy thereof, and the impartment of any other characteristic, such as fluidity, thereto. For example, in each of Patent Documents 1 and 2, there is a disclosure of a thermoplastic resin that contains a predetermined amount of each of a polycarbonate resin, an acrylonitrile-styrene copolymer (hereinafter sometimes referred to as "AS") or an acrylonitrile-butadiene-styrene copolymer (hereinafter sometimes referred to as "ABS"), a polysiloxane-polycarbonate copolymer, and a phosphorus-containing flame retardant, and that is improved in fluidity and flame retardancy substantially without the deterioration of its impact strength.

In each of Patent Documents 3 and 4, as a polycarbonate resin composition that satisfies moldability, impact resistance, and rigidity while maintaining excellent flame retardancy, and that can be molded into a molded body excellent in thermal stability, there is a disclosure of a polycarbonate resin composition containing, for example, a polycarbonate resin, a styrene-based resin, and a polycarbonate-polyorganosiloxane copolymer and/or a functional group-containing silicone compound.

In addition, in Patent Document 5, there is a disclosure of a polycarbonate resin composition that contains a polycarbonate and/or a copolyester carbonate having an aliphatic segment, an ABS-based resin and/or an acrylonitrile-styrene (AS) resin, a phosphate-based compound, and a polysiloxane-polycarbonate block copolymer, and that has excellent flame retardancy even when molded into a thin shape.

CITATION LIST

Patent Literature

PTL1: JP 2006-52401 A
PTL2: JP 2008-516013 A
PTL3: JP 2000-191898 A
PTL4: JP 2001-55500 A
PTL5: JP 04-285655 A

SUMMARY OF INVENTION

Technical Problem

A polycarbonate resin composition that can be molded into a thin-walled and large-sized molded body is required to have high fluidity comparable to that of an ABS resin. However, when an attempt is made to improve the fluidity of a polycarbonate resin composition containing a PC-POS, its impact strength tends to reduce, and hence it has heretofore been difficult to achieve both the fluidity and the impact strength at high levels.

Further, the addition of the ABS resin, the AS resin, or the like to the polycarbonate resin composition for improvements in fluidity and impact resistance thereof involves a problem in that its flame retardancy and chemical resistance reduce.

An object to be achieved by the present invention is to provide a polycarbonate resin composition that is excellent in fluidity, flame retardancy, and chemical resistance, and can provide a molded body having a high impact strength.

Solution to Problem

The inventors of the present invention have made extensive investigations, and as a result, have found that the above-mentioned object can be achieved by setting, in a polycarbonate resin composition containing a PC-POS and a specific copolymer, each of the content of a POS block moiety in the resin composition and the content of a copolymerizable component in the copolymer within a specific range. Thus, the inventors have completed the present invention.

That is, the present invention relates to the following items [1] to [16].

[1] A polycarbonate resin composition, comprising: a polycarbonate resin (A) containing a polycarbonate-polyorganosiloxane copolymer (A-1) having a polycarbonate block comprising a repeating unit represented by the following general formula (I) and a polyorganosiloxane block comprising a repeating unit represented by the following general formula (II); a copolymer (B) having constituent units derived from acrylonitrile and styrene, and being free of a constituent unit derived from methyl methacrylate; and a copolymer (C) having constituent units derived from butadiene and methyl methacrylate, wherein: a content of the polyorganosiloxane block moiety in the entire resin composition is from 0.1 mass % to 10 mass %; a total of a content of the constituent unit derived from the acrylonitrile in the entire resin composition and a content of the constituent unit derived from the styrene in the entire resin composition is from 8 mass % to 45 mass %; a content of the constituent unit derived from the butadiene in the entire resin composition is from 3 mass % to 10 mass %; and the polycarbonate resin (A) has a viscosity-average molecular weight (Mv) of from 20,000 to 25,000:

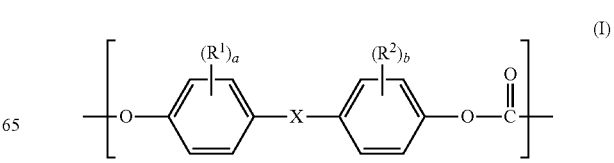

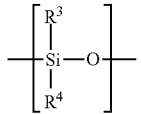

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

[2] The polycarbonate resin composition according to Item [1], wherein a content of the polyorganosiloxane block moiety in the polycarbonate resin (A) is from 0.1 mass % to 15 mass %.

[3] The polycarbonate resin composition according to Item [1] or [2], wherein the polyorganosiloxane block in the polycarbonate-polyorganosiloxane copolymer (A-1) has a chain length of from 30 to 500.

[4] The polycarbonate resin composition according to any one of Items [1] to [3], wherein the copolymer (B) contains an acrylonitrile-butadiene-styrene terpolymer (B-1).

[5] The polycarbonate resin composition according to any one of Items [1] to [4], wherein the copolymer (B) contains an acrylonitrile-styrene bipolymer (B-2).

[6] The polycarbonate resin composition according to any one of Items [1] to [5], wherein the copolymer (C) contains at least one selected from the group consisting of a methyl methacrylate-butadiene-styrene terpolymer and a methyl methacrylate-butadiene bipolymer.

[7] The polycarbonate resin composition according to any one of Items [1] to [6], wherein the copolymer (C) comprises a methyl methacrylate-butadiene bipolymer.

[8] The polycarbonate resin composition according to any one of Items [1] to [7], wherein the copolymer (C) has an average particle diameter of from 100 nm to 300 nm.

[9] The polycarbonate resin composition according to any one of Items [5] to [8], wherein a content of the acrylonitrile-butadiene-styrene terpolymer (B-1) is from 8 parts by mass to 100 parts by mass, a content of the acrylonitrile-styrene bipolymer (B-2) is 20 parts by mass or less, and a content of the copolymer (C) is from 1 part by mass to 8 parts by mass with respect to 100 parts by mass of the polycarbonate resin (A).

[10] The polycarbonate resin composition according to any one of Items [1] to [9], further comprising a flame retardant (D).

[11] The polycarbonate resin composition according to Item [10], wherein the component (D) comprises a phosphorus-based flame retardant.

[12] The polycarbonate resin composition according to Item [11], wherein the phosphorus-based flame retardant comprises a condensed phosphate.

[13] The polycarbonate resin composition according to any one of Items [10] to [12], wherein a content of the flame retardant (D) is from 10 parts by mass to 40 parts by mass with respect to 100 parts by mass of the polycarbonate resin (A).

[14] A polycarbonate resin composition, comprising: a polycarbonate resin (A) containing a polycarbonate-polyorganosiloxane copolymer (A-1) having a polycarbonate block comprising a repeating unit represented by the following general formula (I) and a polyorganosiloxane block comprising a repeating unit represented by the following general formula (II); a copolymer (B) having constituent units derived from acrylonitrile and styrene, and being free of a constituent unit derived from methyl methacrylate; a copolymer (C) having constituent units derived from butadiene and methyl methacrylate; and a flame retardant (D), the copolymer (C) comprising a methyl methacrylate-butadiene bipolymer, the flame retardant (D) comprising a phosphorus-based flame retardant that comprises a condensed phosphate, wherein: a content of the polyorganosiloxane block moiety in the entire resin composition is from 0.1 mass % to 10 mass %; a total of a content of the constituent unit derived from the acrylonitrile in the entire resin composition and a content of the constituent unit derived from the styrene in the entire resin composition is from 8 mass % to 45 mass %; a content of the constituent unit derived from the butadiene in the entire resin composition is from 3 mass % to 10 mass %; and the polycarbonate resin (A) has a viscosity-average molecular weight (Mv) of from 20,000 to 25,000:

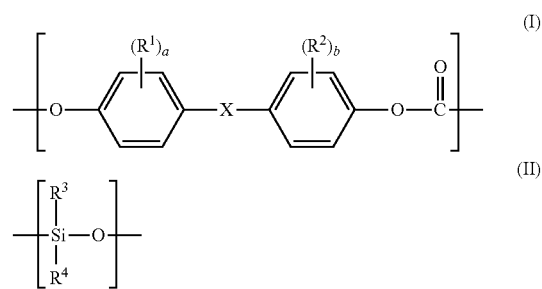

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

[15] The polycarbonate resin composition according to Item [14], in which a content of the copolymer (B) is from 8 parts by mass to 100 parts by mass, a content of the copolymer (C) is from 1 part by mass to 8 parts by mass, and a content of the flame retardant (D) is from 10 parts by mass to 40 parts by mass with respect to 100 parts by mass of the polycarbonate resin (A).

[16] A molded body, comprising the polycarbonate resin composition of any one of Items [1] to [is].

Advantageous Effects of Invention

According to the present invention, it is possible to provide the polycarbonate resin composition that is excellent in fluidity, flame retardancy, and chemical resistance, and can provide a molded body having a high impact strength.

DESCRIPTION OF EMBODIMENTS

A polycarbonate resin composition of the present invention is described in detail below. In this description, a specification considered to be preferred can be arbitrarily adopted, and a combination of preferred specifications can be said to be more preferred. In addition, the term "from XX to YY" as used herein means "XX or more and YY or less."

[Polycarbonate Resin Composition]

The polycarbonate resin composition of the present invention comprises: a polycarbonate resin (A) containing a polycarbonate-polyorganosiloxane copolymer (A-1) having a polycarbonate block comprising a repeating unit represented by the following general formula (I) and a polyorganosiloxane block comprising a repeating unit represented by the following general formula (II); a copolymer (B) having constituent units derived from acrylonitrile and styrene, and being free of a constituent unit derived from methyl methacrylate; and a copolymer (C) having constituent units derived from butadiene and methyl methacrylate, wherein: a content of the polyorganosiloxane block moiety in the entire resin composition is from 0.1 mass % to 10 mass %; a total of a content of the constituent unit derived from the acrylonitrile in the entire resin composition and a content of the constituent unit derived from the styrene in the entire resin composition is from 8 mass % to 45 mass %; a content of the constituent unit derived from the butadiene in the entire resin composition is from 3 mass % to 10 mass %; and the polycarbonate resin (A) has a viscosity-average molecular weight (Mv) of from 20,000 to 25,000:

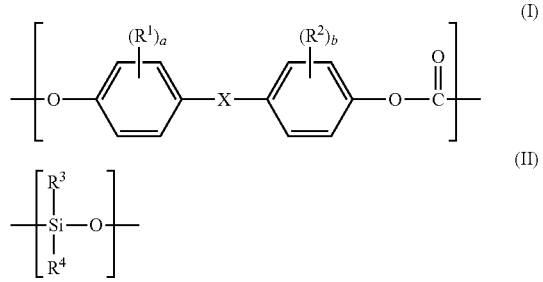

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

[Polycarbonate Resin (A)]

The polycarbonate resin (A) (hereinafter sometimes referred to as "component (A)") to be used in the present invention contains the polycarbonate-polyorganosiloxane copolymer (A-1) (hereinafter sometimes referred to as "PC-POS (A-1)" or "component (A-1)"). As described later, an aromatic polycarbonate resin (A-2) except the component (A-1) may be incorporated as the component (A) to the extent that the effects of the present invention are not impaired.

The content of the polyorganosiloxane block moiety containing a repeating unit represented by the general formula (II) in the polycarbonate resin (A) is preferably from 0.1 mass % to 15 mass %, more preferably from 0.25 mass % to 10 mass %, still more preferably from 0.4 mass % to 6.0 mass %. When the content is 0.1 mass % or more, an improving effect on the impact strength of the composition becomes higher, and when the content is 15 mass % or less, a reduction in impact strength thereof can be easily avoided.

Here, the content of the polyorganosiloxane block moiety in the component (A) can be calculated by nuclear magnetic resonance (NMR).

The viscosity-average molecular weight (Mv) of the polycarbonate resin (A) is from 20,000 to 25,000, preferably from 21,000 to 24,000, more preferably from 22,000 to 23,000. When the viscosity-average molecular weight of the component (A) falls within the range, balance between the fluidity and impact resistance of the composition becomes more excellent.

In the present invention, the viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C. (concentration unit: g/L) with an Ubbelohde-type viscometer.

The content of the component (A-1) in the component (A) is preferably from 10 mass % to 100 mass %, more preferably from 15 mass % to 100 mass %, still more preferably from 20 mass % to 100 mass % from the viewpoint that the content of the polyorganosiloxane block moiety in the component (A) is preferably adjusted within the above-mentioned range.

A content of the component (A-1) of 10 mass % or more is preferred in terms of the production of the PC-POS because there is no need to increase the content of the polyorganosiloxane block moiety in the component (A-1).

<Polycarbonate-polyorganosiloxane Copolymer (A-1)>

The PC-POS (A-1) is a polycarbonate-polyorganosiloxane copolymer having a polycarbonate block formed of a repeating unit represented by the following general formula (I) and a polyorganosiloxane block containing a repeating unit represented by the following general formula (II):

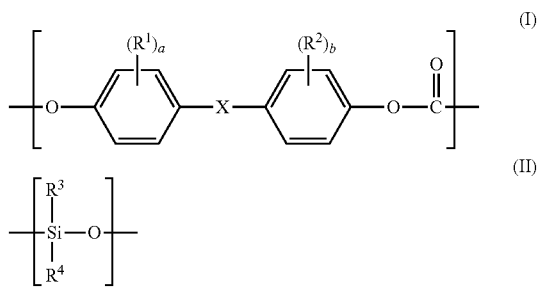

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

One of the PC-POS's (A-1) may be used alone, or two or more thereof may be used in combination. In addition, the number of kinds of the repeating units each represented by the general formula (I) in the PC-POS (A-1) may be only one, or may be two or more. The same holds true for the repeating unit represented by the general formula (II) in the PC-POS (A-1).

Examples of the halogen atom that $R^1$ and $R^2$ in the general formula (I) each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups ("various" means that a linear group and any branched group are included, and the same shall apply hereinafter), various pentyl groups, and various hexyl groups. An example of the alkoxy group that $R^1$ and $R^2$ each independently represent is an alkoxy group whose alkyl group moiety is the alkyl group described above.

$R^1$ and $R^2$ each preferably represent an alkyl group having 1 to 4 carbon atoms or an alkoxy group having 1 to 4 carbon atoms.

Examples of the alkylene group represented by X include a methylene group, an ethylene group, a trimethylene group, a tetramethylene group, and a hexamethylene group, and an alkylene group having 1 to 5 carbon atoms is preferred. Examples of the alkylidene group represented by X include an ethylidene group and an isopropylidene group. The cycloalkylene group represented by X is preferably a cycloalkylene group having 5 to 10 carbon atoms, and examples thereof include a cyclopentanediyl group, a cyclohexanediyl group, and a cyclooctanediyl group. Examples of the cycloalkylidene group represented by X include a cyclohexylidene group, a 3,5,5-trimethylcyclohexylidene group, and a 2-adamantylidene group, a cycloalkylidene group having 5 to 10 carbon atoms is preferred, and a cycloalkylidene group having 5 to 8 carbon atoms is more preferred. As an aryl moiety of the arylalkylene group represented by X, there are given, for example, aryl groups each having 6 to 14 ring-forming carbon atoms, such as a phenyl group, a naphthyl group, a biphenyl group, and an anthryl group. As an aryl moiety of the arylalkylidene group represented by X, there are given, for example, aryl groups each having 6 to 14 ring-forming carbon atoms, such as a phenyl group, a naphthyl group, a biphenyl group, and an anthryl group.

a and b each independently represent an integer of from 0 to 4, preferably from 0 to 2, more preferably 0 or 1.

Examples of the halogen atom that $R^3$ and $R^4$ in the general formula (II) each independently represent include a fluorine atom, a chlorine atom, a bromine atom, and an iodine atom. Examples of the alkyl group or alkoxy group that $R^3$ and $R^4$ each independently represent include the same examples as those in the case of $R^1$ and $R^2$. Examples of the aryl group that $R^3$ and $R^4$ each independently represent include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

The chain length of the polyorganosiloxane block in the PC-POS (A-1) is preferably from 30 to 500, more preferably from 30 to 150, still more preferably from 30 to 120. When the chain length of the polyorganosiloxane block in the PC-POS (A-1) is 30 or more, the impact resistance becomes sufficient. When the chain length of the polyorganosiloxane block in the PC-POS (A-1) is 500 or less, handleability at the time of the production of the copolymer becomes satisfactory.

The structure of the polyorganosiloxane block containing a repeating unit represented by the general formula (II) is preferably represented by any one of the following general formulae (II-I) to (II-III):

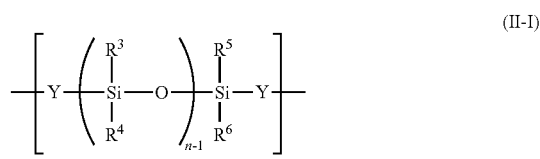

(II-I)

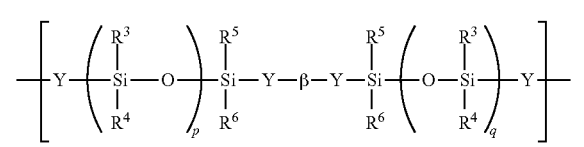

(II-II)

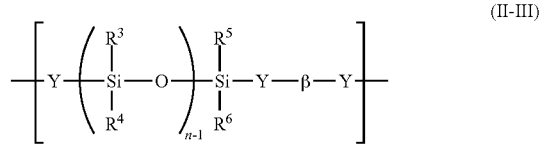

(II-III)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$'s, $R^4$'s, $R^5$'s, or $R^6$'s may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y's may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, β represents a divalent group derived from a diisocyanate compound, or a divalent group derived from a dicarboxylic acid or a halide of a dicarboxylic acid, n represents an average chain length of the polyorganosiloxane, and p and q each represent an integer of 1 or more, and the sum of p and q is n−2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. An example of the alkoxy group that $R^3$ to $R^6$ each independently represent is an alkoxy group whose alkyl group moiety is the alkyl group described above. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

$R^3$ to $R^6$ in the general formula (II-I), the general formula (II-II), and/or the general formula (II-III) each preferably represent a methyl group.

The linear or branched alkylene group represented by $R^7$ in —$R^7$O—, —$R^7$COO—, —$R^7$NH—, —$R^7NR^8$—, —COO—, —S—, —$R^7$COO—$R^9$—O—, or —$R^7$O—$R^{10}$—O— represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The content of the polyorganosiloxane block moiety containing the repeating unit represented by the general formula (II) in the PC-POS (A-1) is preferably from 2.0 mass % to 15 mass %, more preferably from 3.0 mass % to 8.5 mass %, still more preferably from 3.2 mass % to 7.5 mass %. When the content is 2.0 mass % or more, the impact resistance of the resin composition to be obtained becomes more satisfactory. In addition, when the content is 15 mass % or less, handleability at the time of the production of the PC-POS (A-1) becomes more satisfactory.

The viscosity-average molecular weight (Mv) of the PC-POS (A-1) is preferably from 10,000 to 25,000, more preferably from 12,000 to 23,000. When the viscosity-average molecular weight of the component (A-1) falls within the range, it is easy to balance the fluidity with impact resistance of the resin composition.

In order that the polyorganosiloxane block for forming the PC-POS (A-1) to be used in the present invention may have the foregoing feature, a polyorganosiloxane represented by the following general formula (1), the following general formula (2), and/or the following general formula (3) can be used as a raw material:

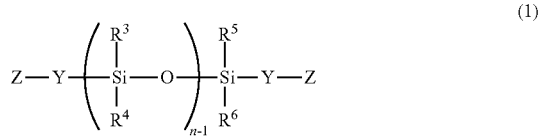
(1)

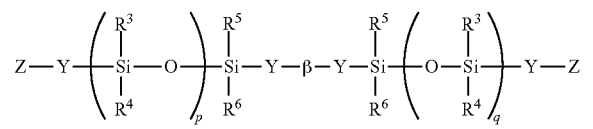
(2)

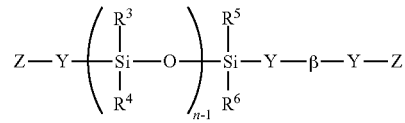
(3)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$'s, $R^4$'s, $R^5$'s, or $R^6$'s may be identical to or different from each other, Y represents —$R^7$O—, —$R^7$COO—, —$R^7$NH—, —$R^7NR^8$—, —COO—, —S—, —$R^7$COO—$R^9$—O—, or —$R^7$O—$R^{10}$—O—, and a plurality of Y's may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom and a plurality of Z's may be identical to or different from each other, β represents a divalent group derived from a diisocyanate compound, or a divalent group derived from a dicarboxylic acid or a halide of a dicarboxylic acid, p and q each represent an integer of 1 or more, and the sum of p and q is n−2, and n represents an average chain length of the polyorganosiloxane.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. An example of the alkoxy group that $R^3$ to $R^6$ each independently represent is an alkoxy group whose alkyl group moiety is the alkyl group described above. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

The polyorganosiloxane represented by the general formula (1), the general formula (2), and/or the general formula (3) is preferably a polyorganosiloxane in which $R^3$ to $R^6$ each represent a methyl group.

The linear or branched alkylene group represented by $R^7$ in —$R^7$O—, —$R^7$COO—, —$R^7$NH—, —$R^7NR^8$—, —COO—, —S—, —$R^7$COO—$R^9$—O—, or —$R^7$O—$R^{10}$—O— represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (4) or (5), provided that when the block has the aryl-substituted alkylene group, the alkylene group is bonded to Si:

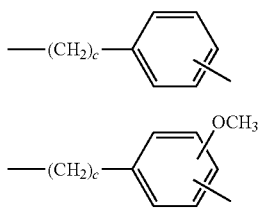
(4)

(5)

wherein c represents a positive integer and typically represents an integer of from 1 to 6.

The diarylene group represented by any one of $R^7$, $R^9$, and $R^{10}$ is a group in which two arylene groups are linked to each other directly or through a divalent organic group, and is specifically a group having a structure represented by —$Ar^1$—W—$Ar^2$—. Here, $Ar^1$ and $Ar^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —$R^7$O—. $R^7$ preferably represents an aryl-substituted alkylene group, in particular a residue of a phenol-based compound having an alkyl group, and more preferably represents an organic residue derived from allylphenol or an organic residue derived from eugenol.

With regard to p and q in the general formula (2), it is preferred that p=q, i.e., p=(n−2)/2 and q=(n−2)/2.

As described above, n represents preferably from 20 to 85, more preferably from 20 to 75, still more preferably from 20 to 60.

In addition, β represents a divalent group derived from a diisocyanate compound, or a divalent group derived from a dicarboxylic acid or a halide of a dicarboxylic acid, and examples thereof include divalent groups represented by the following general formulae (6-1) to (6-5).

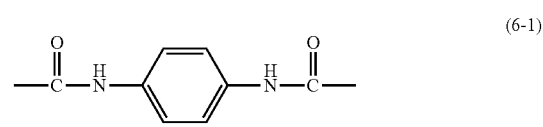
(6-1)

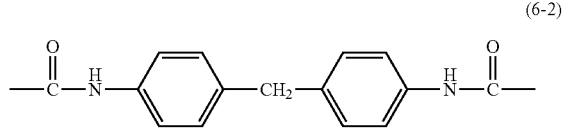
(6-2)

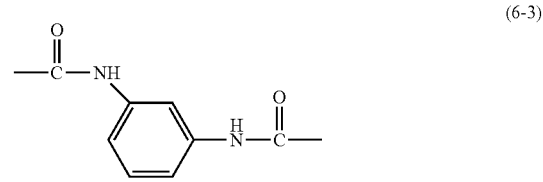
(6-3)

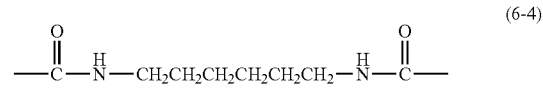
(6-4)

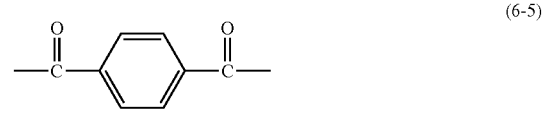
(6-5)

Examples of the polyorganosiloxane represented by the general formula (1) include compounds represented by the following general formulae (1-1) to (1-11).

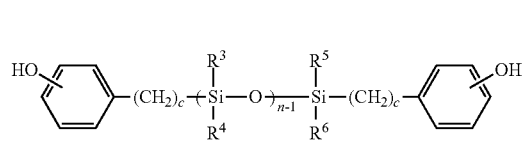
(1-1)

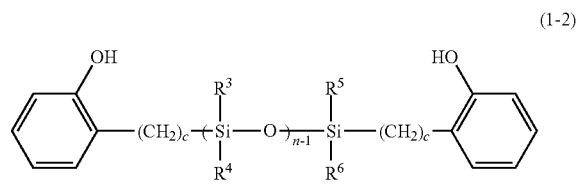
(1-2)

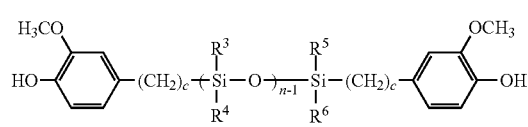
(1-3)

(1-4)

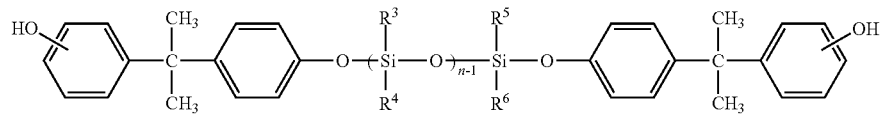
(1-5)

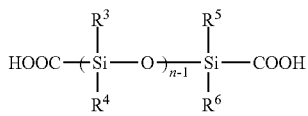
(1-6)

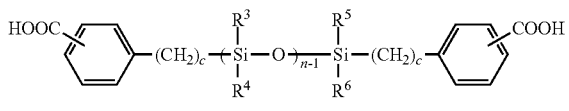
(1-7)

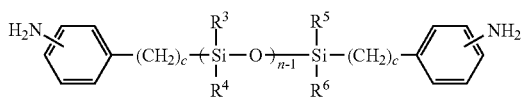
(1-8)

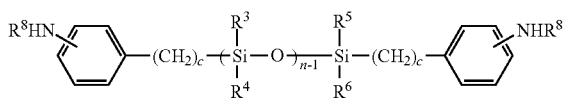
(1-9)

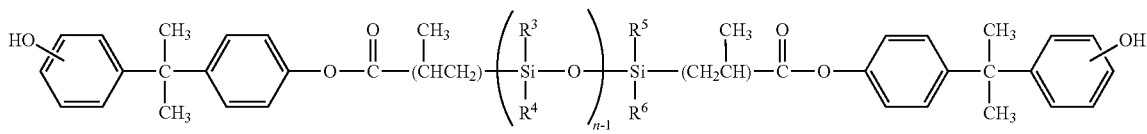
(1-10)

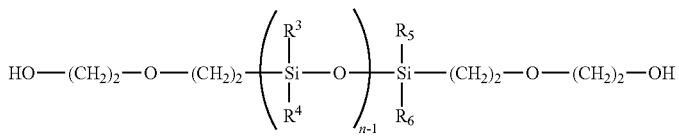
(1-11)

In the general formulae (1-1) to (1-11), $R^3$ to $R^6$, n, and $R^8$ are as defined above, and preferred examples thereof are also the same as those described above, and c represents a positive integer and typically represents an integer of from 1 to 6.

Among them, a phenol-modified polyorganosiloxane represented by the general formula (1-1) is preferred from the viewpoint of its ease of polymerization. In addition, an α,ω-bis[3-(o-hydroxyphenyl)propyl]polydimethylsiloxane, which is one kind of compound represented by the general formula (1-2), or an α,ω-bis[3-(4-hydroxy-3-methoxyphenyl)propyl]polydimethylsiloxane, which is one kind of compound represented by the general formula (1-3), is preferred from the viewpoint of its ease of availability.

In addition to the foregoing, a compound having a structure represented by the following general formula (1-12) may be used as a polyorganosiloxane raw material:

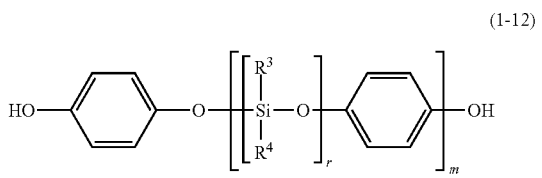
(1-12)

wherein $R^3$ and $R^4$ are identical to those described above. The average chain length of the polyorganosiloxane block represented by the general formula (1-12) is (r×m), and the range of the (r×m) is the same as that of the n.

When the compound represented by the general formula (1-12) is used as a polyorganosiloxane raw material, the polyorganosiloxane block preferably has a repeating unit represented by the following general formula (II-IV):

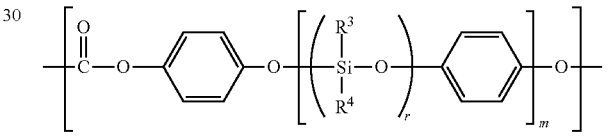
(II-IV)

wherein $R^3$, $R^4$, r, and m are as described above.

In addition to the polyorganosiloxane shown above, polyorganosiloxane compounds disclosed in the following literatures may also be suitably used: JP 2013-523938 A, JP 04-225059 A, JP 2006-518803 A, WO 2013/115604 A1, and the like.

A gel permeation chromatographic (GPC) apparatus for obtaining the measured values of the molecular weight and molecular weight distribution of the polyorganosiloxane is not particularly limited, and a GPC apparatus that is generally on the market, such as a GPC measuring machine with an internal refractive index (RI) detector "HLC-8200" manufactured by Tosoh Corporation, can be utilized. In particular, a product obtained by coupling "TSK-GEL G4000HXL" and "TSK-GEL G2000HXL" manufactured by Tosoh Corporation is used as a GPC column. A column temperature is set to 40° C., tetrahydrofuran (THF) is used as an eluent, and measurement is performed at a flow rate of 1.0 mL/min.

A method of producing the polyorganosiloxane is not particularly limited. According to, for example, a method described in JP 11-217390 A, a crude polyorganosiloxane can be obtained by: causing cyclotrisiloxane and disiloxane to react with each other in the presence of an acid catalyst to synthesize α,ω-dihydrogen organopentasiloxane; and then subjecting a phenolic compound (such as 2-allylphenol, 4-allylphenol, eugenol, or 2-propenylphenol) or the like to an addition reaction with the α,ω-dihydrogen organopentasiloxane in the presence of a catalyst for a hydrosilylation reaction. In addition, according to a method described in JP 2662310 B2, the crude polyorganosiloxane can be obtained by: causing octamethylcyclotetrasiloxane and tetramethyldisiloxane to react with each other in the presence of sulfuric acid (acid catalyst); and subjecting a phenolic compound or the like to an addition reaction with the resultant α,ω-dihydrogen polyorganosiloxane in the presence of the catalyst for a hydrosilylation reaction in the same manner as described above. The chain length n of the α,ω-dihydrogen polyorganosiloxane can be appropriately adjusted depending on a polymerization condition therefor before its use, or a commercially available α,ω-dihydrogen polyorganosiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, a solution of chloroplatinic acid in an alcohol, an olefin complex of platinum, a complex of platinum and a vinyl group-containing siloxane, platinum-supported silica, and platinum-supported activated carbon.

An adsorbent is preferably caused to adsorb and remove a transition metal derived from a transition metal-based catalyst used as the catalyst for a hydrosilylation reaction in the crude polyorganosiloxane by bringing the crude polyorganosiloxane into contact with the adsorbent.

An adsorbent having an average pore diameter of, for example, 1,000 Å or less can be used as the adsorbent. When the average pore diameter is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, yet still more preferably 100 Å or less. In addition, from the same viewpoint, the adsorbent is preferably a porous adsorbent.

The adsorbent is not particularly limited as long as the adsorbent has the above-mentioned average pore diameter. For example, there may be used activated clay, acidic clay, activated carbon, synthetic zeolite, natural zeolite, activated alumina, silica, a silica-magnesia-based adsorbent, diatomaceous earth, and cellulose. Among them, preferred is at least one kind selected from the group consisting of activated clay, acidic clay, activated carbon, synthetic zeolite, natural zeolite, activated alumina, silica, and a silica-magnesia-based adsorbent.

After the adsorbent has been caused to adsorb the transition metal in the crude polyorganosiloxane, the adsorbent can be separated from the polyorganosiloxane by arbitrary separating means. Examples of the means for separating the adsorbent from the polyorganosiloxane include a filter and centrifugation. When the filter is used, a filter such as a membrane filter, a sintered metal filter, or a glass fiber filter can be used. Among them, the membrane filter is particularly preferably used.

The average particle diameter of the adsorbent is typically from 1 µm to 4 mm, preferably from 1 µm to 100 µm from the viewpoint of separating the adsorbent from the polyorganosiloxane after the adsorption of the transition metal.

When the adsorbent is used, its usage amount is not particularly limited. A porous adsorbent can be used in an amount in the range of preferably from 1 part by mass to 30 parts by mass, more preferably from 2 parts by mass to 20 parts by mass with respect to 100 parts by mass of the crude polyorganosiloxane.

When the crude polyorganosiloxane to be treated has so high a molecular weight that the crude polyorganosiloxane is not in a liquid state, the polyorganosiloxane may be heated to such a temperature as to be in a liquid state upon performance of the adsorption with the adsorbent and the separation of the adsorbent. Alternatively, the adsorption and the separation may be performed under a state in which the polyorganosiloxane is dissolved in a solvent, such as methylene chloride or hexane.

«Method of Producing PC-POS (A-1)»

A known production method, such as an interfacial polymerization method (phosgene method), a pyridine method, or an ester exchange method, can be employed as a method of producing the PC-POS (A-1) to be used in the present invention. Particularly in the case of the interfacial polymerization method, the step of separating an organic phase containing the PC-POS (A-1) and an aqueous phase containing an unreacted substance, a catalyst residue, or the like becomes easy, and hence the separation of the organic phase containing the PC-POS (A-1) and the aqueous phase in each washing step based on alkali washing, acid washing, or pure water washing becomes easy. Accordingly, the PC-POS (A-1) is efficiently obtained.

The method of producing the PC-POS (A-1) is not particularly limited and the PC-POS (A-1) can be produced with reference to a known method of producing a PC-POS, such as a method described in JP 2010-241943 A.

Specifically, the PC-POS (A-1) can be produced by: dissolving a polycarbonate oligomer produced in advance and the polyorganosiloxane in a water-insoluble organic solvent (such as methylene chloride); adding an alkaline aqueous solution (such as aqueous sodium hydroxide) of a dihydric phenol-based compound (such as bisphenol A) to the solution; and subjecting the mixture to an interfacial polycondensation reaction through the use of a tertiary amine (such as triethylamine) or a quaternary ammonium salt (such as trimethylbenzylammonium chloride) as a polymerization catalyst in the presence of a terminal stopper (a monohydric phenol, such as p-t-butylphenol). In addition, the PC-POS (A-1) can be produced by copolymerizing a polyorganosiloxane, a dihydric phenol, and phosgene, a carbonate ester, or a chloroformate.

The polycarbonate oligomer can be produced through a reaction of a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer can also be produced through a reaction of a dihydric phenol and a carbonate precursor, such as diphenyl carbonate.

A dihydric phenol represented by the following general formula (i) is preferably used as the dihydric phenol:

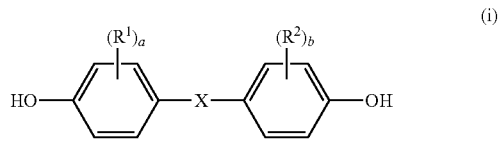

(i)

wherein $R^1$, $R^2$, a, b, and X are as described above.

Examples of the dihydric phenol represented by the general formula (i) include a bis(hydroxyaryl)alkane, a bis(hydroxyaryl)cycloalkane, a dihydroxyaryl ether, a dihydroxydiaryl sulfide, a dihydroxydiaryl sulfoxide, a dihydroxydiaryl sulfone, a dihydroxydiphenyl, a dihydroxydiarylfluorene, and a dihydroxydiaryladamantane. One of those dihydric phenols may be used alone, or two or more thereof may be used as a mixture.

Examples of the bis(hydroxyaryl)alkane include bis(4-hydroxyphenyl)methane, 1,1-bis(4-hydroxyphenyl)ethane, 2,2-bis(4-hydroxyphenyl)propane [bisphenol A], 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkane include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornene, and 1,1-bis(4-hydroxyphenyl)cyclododecane. Examples of the dihydroxyaryl ether include 4,4'-dihydroxydiphenyl ether and 4,4'-dihydroxy-3,3'-dimethylphenyl ether.

Examples of the dihydroxydiaryl sulfide include 4,4'-dihydroxydiphenyl sulfide and 4,4'-dihydroxy-3,3'-dimethyldiphenyl sulfide. Examples of the dihydroxydiaryl sulfoxide include 4,4'-dihydroxydiphenyl sulfoxide and 4,4'-dihydroxy-3,3'-dimethyldiphenyl sulfoxide. Examples of the dihydroxydiaryl sulfone include 4,4'-dihydroxydiphenyl sulfone and 4,4'-dihydroxy-3,3'-dimethyldiphenyl sulfone.

An example of the dihydroxydiphenyl is 4,4'-dihydroxydiphenyl. Examples of the dihydroxydiarylfluorene include 9,9-bis(4-hydroxyphenyl)fluorene and 9,9-bis(4-hydroxy-3-methylphenyl)fluorene. Examples of the dihydroxydiaryladamantane include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of the dihydric phenol other than the above-mentioned dihydric phenols include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

One of the dihydric phenols may be used alone, or two or more thereof may be used as a mixture.

Among them, bis(hydroxyphenyl)alkanes are preferred, and bisphenol A is more preferred. When bisphenol A is used as the dihydric phenol, X represents an isopropylidene group and a relationship of a=b=0 is satisfied in the general formula (i).

In order to control the molecular weight of the PC-POS to be obtained, a terminal stopper can be used. Examples of the terminal stopper may include monohydric phenols, such as phenol, p-cresol, p-tert-butylphenol, p-tert-octylphenol, p-cumylphenol, p-nonylphenol, m-pentadecylphenol, and p-tert-amylphenol. One of those monohydric phenols may be used alone, or two or more thereof may be used in combination.

After the interfacial polycondensation reaction, the liquid is appropriately left at rest to be separated into an aqueous phase and an organic solvent phase [separating step], the organic solvent phase is washed (preferably washed with a basic aqueous solution, an acidic aqueous solution, and water in the stated order) [washing step], and the resultant organic phase is concentrated [concentrating step], and dried [drying step]. Thus, the PC-POS copolymer can be obtained.

The phenol-modified polyorganosiloxane can be produced by a known method. For example, the following method is given as the production method.

First, cyclotrisiloxane and disiloxane are caused to react with each other in the presence of an acid catalyst to synthesize an α,ω-dihydrogen polyorganosiloxane. At this time, an α,ω-dihydrogen polyorganosiloxane having a desired average chain length can be synthesized by changing a blending ratio between cyclotrisiloxane and disiloxane. Then, the α,ω-dihydrogen polyorganosiloxane is subjected to an addition reaction with a phenol compound having an unsaturated aliphatic hydrocarbon group, such as allylphenol or eugenol, in the presence of a catalyst for a hydrosilylation reaction, whereby a phenol-modified polyorganosiloxane having a desired average chain length can be produced.

In addition, at this stage, a cyclic polyorganosiloxane having a low molecular weight and an excessive amount of the phenol compound remain as impurities. Accordingly, those low-molecular weight compounds are preferably removed by distillation with heating under reduced pressure.

<Aromatic Polycarbonate Resin (A-2)>

As described above, the aromatic polycarbonate resin (A-2) (hereinafter sometimes referred to as "component (A-2)") except the component (A-1) may be incorporated as the component (A) to the extent that the effects of the present invention are not impaired. The component (A-2) is obtained by using an aromatic dihydric phenol-based compound, and can be used for adjusting the content of the polyorganosiloxane block moiety containing the repeating unit represented by the general formula (II) in the component (A).

The viscosity-average molecular weight (Mv) of the aromatic polycarbonate resin serving as the component (A-2) is preferably from 10,000 to 40,000, more preferably from 13,000 to 30,000 in terms of physical properties.

The aromatic polycarbonate resin (A-2) is free of a repeating structure represented by the general formula (II), and its main chain is preferably formed of a repeating unit represented by the following general formula (III). Such aromatic polycarbonate resin is not particularly limited, and any one of the various known aromatic polycarbonate resins can be used.

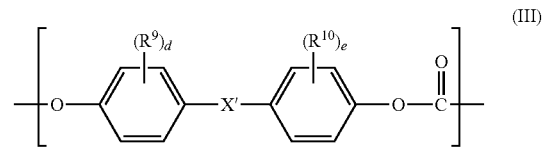

wherein $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of from 0 to 4.

Specific examples of $R^9$ and $R^{10}$ include the same examples as those of $R^1$ and $R^2$, and preferred examples thereof are also the same as those of $R^1$ and $R^2$. $R^9$ and $R^{10}$ each more preferably represent an alkyl group having 1 to 6 carbon atoms or an alkoxy group having 1 to 6 carbon atoms. Specific examples of X' include the same examples as those of X, and preferred examples thereof are also the same as those of X. d and e each independently represent preferably from 0 to 2, more preferably 0 or 1.

Specifically, a resin obtained by a conventional production method for an aromatic polycarbonate can be used as the aromatic polycarbonate resin. Examples of the conventional method include: an interfacial polymerization method involving causing the aromatic dihydric phenol-based compound and phosgene to react with each other in the presence of an organic solvent inert to the reaction and an aqueous alkaline solution, adding a polymerization catalyst, such as a tertiary amine or a quaternary ammonium salt, to the resultant, and polymerizing the mixture; and a pyridine method involving dissolving the aromatic dihydric phenol-based compound in pyridine or a mixed solution of pyridine and an inert solvent, and introducing phosgene to the solution to directly produce the resin.

A molecular weight modifier (terminal stopper), a branching agent, or the like is used as required in the reaction.

The aromatic dihydric phenol-based compound is, for example, a compound represented by the following general formula (III'):

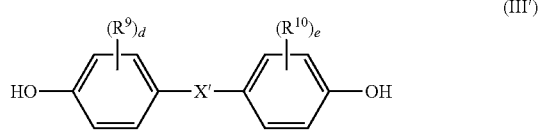

wherein $R^9$, $R^{10}$, X', d, and e are as defined above, and preferred examples thereof are also the same as those described above.

Specific examples of the aromatic dihydric phenol-based compound include bis(hydroxyphenyl)alkane-based dihydric phenols such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone.

Among them, bis(hydroxyphenyl)alkane-based dihydric phenols are preferred, and bisphenol A is more preferred.

One of the aromatic polycarbonate resins (A-2) may be used alone, or two or more thereof may be used in combination.

[Copolymer (B)]

The polycarbonate resin composition of the present invention contains, as the component (B), the copolymer having the constituent units derived from acrylonitrile and styrene, and being free of any constituent unit derived from methyl methacrylate. When the polycarbonate resin composition contains the component (B), the resin composition is excellent in fluidity. In addition, the component has the constituent unit derived from acrylonitrile and hence a resin composition having satisfactory compatibility with the component (A) can be obtained.

Examples of the component (B) include an acrylonitrile-styrene bipolymer (AS) and a copolymer that is ternary or more, the copolymer being obtained by further copolymerizing any other component with acrylonitrile and styrene.

Specific examples of the other component include polybutadiene, a (meth)acrylic acid ester (except methyl methacrylate), styrene-butadiene-styrene rubber (SBS), styrene-butadiene rubber (SBR), butadiene-acrylic rubber, isoprene rubber, isoprene-styrene rubber, isoprene-acrylic rubber, ethylene-propylene rubber, and ethylene-propylene-diene rubber. Among them, polybutadiene is particularly preferred. As the polybutadiene to be used in this case, any one of the following polybutadienes may be used, or a mixture thereof may be used: low cis polybutadiene (such as polybutadiene containing 1 mol % to 30 mol % of a 1,2-vinyl bond and 30 mol % to 42 mol % of a 1,4-cis bond) and high cis polybutadiene (such as polybutadiene containing 20 mol % or less of a 1,2-vinyl bond and 78 mol % or more of a 1,4-cis bond).

Specific examples of the copolymer that is ternary or more include an acrylonitrile-acrylate-styrene terpolymer (AAS), an acrylonitrile-butadiene-styrene terpolymer (ABS) obtained by polymerizing polybutadiene with acrylonitrile and styrene, and an acrylonitrile-(ethylene/propylene/diene copolymer)-styrene copolymer (AES).

One of the copolymers may be used alone, or two or more thereof may be used in combination.

Among the copolymers, the component (B) preferably contains at least an acrylonitrile-butadiene-styrene terpolymer (B-1) (hereinafter sometimes referred to as "component (B-1)") in terms of an improvement in fluidity of the resin composition and an improvement in impact resistance thereof by the incorporation of a rubber component. In addition, the component may further contain an acrylonitrile-styrene bipolymer (B-2) (hereinafter sometimes referred to as "component (B-2)") in terms of the improvement in fluidity.

The content of a constituent unit derived from butadiene in the component (B-1) is preferably from 8 mass % to 75 mass %, more preferably from 8 mass % to 50 mass %, still more preferably from 8 mass % to 25 mass %. When the content of the constituent unit derived from butadiene in the component (B-1) is 8 mass % or more, the impact resistance of a molded body is further improved.

The melt volume rate (MVR) of the component (B-2) measured at a temperature of 200° C. and a load of 10 kgf is preferably from 3 cm³/10 min to 150 cm³/10 min. When the MVR of the component (B-2) falls within the range, the fluidity of the resin composition is further improved. In particular, when a component in which the content of the constituent unit derived from butadiene is from 30 mass % to 70 mass % is used as the component (B-1), the MVR of the component (B-2) to be used is more preferably from 50 cm³/10 min to 150 cm³/10 min from the viewpoint of an improvement in fluidity of the resin composition.

The MVR can be measured by a method in conformity with ISO 1133.

As a commercial product of the ABS serving as the component (B-0, there may be given, for example, "SANTAC AT-05" and "KRALASTIC SXH-330" (each of which is manufactured by Nippon A&L Inc.), "TOYOLAC 500" and "TOYOLAC 700" (each of which is manufactured by Toray Industries, Inc.), "PA-756" (manufactured by Chi Mei Corporation), and "HR181" (manufactured by Kumho Petrochemical Co., Ltd.). In addition, as a commercial product of the AS serving as the component (B-2), there may be given, for example, "290FF" (manufactured by Techno Polymer Co., Ltd.), "S100N", "S200N", and "5101N" (all of which are manufactured by UMG ABS, Ltd.), and "PN-117C" (manufactured by Chi Mei Corporation).

[Copolymer (C)]

The polycarbonate resin composition of the present invention contains, as the component (C), the copolymer having the constituent units derived from butadiene and methyl methacrylate. The incorporation of the component (C) can provide a resin composition particularly excellent in impact resistance.

Examples of the component (C) include a methyl methacrylate-butadiene-styrene terpolymer (MBS) obtained by polymerizing polybutadiene with methyl methacrylate and styrene, a methyl methacrylate-acrylonitrile-butadiene-styrene quaterpolymer (MABS), and a methyl methacrylate-butadiene bipolymer (MB).

One of the copolymers may be used alone, or two or more thereof may be used in combination. The component (C) contains preferably at least one selected from the group consisting of a methyl methacrylate-butadiene-styrene terpolymer and a methyl methacrylate-butadiene bipolymer, more preferably a methyl methacrylate-butadiene bipolymer, among them in terms of an improvement in impact resistance of the resin composition.

The average particle diameter of the component (C) is preferably from 100 nm to 300 nm, more preferably from 125 nm to 275 nm, still more preferably from 150 nm to 250 nm. When the average particle diameter of the component (C) is 100 nm or more and 300 nm or less, a polycarbonate resin composition having a higher impact-resisting characteristic is obtained.

The average particle diameter of the component (C) is measured with a transmission electron microscope. Specifically, the component (A-2) and the component (C) are melt-kneaded at a mass ratio "(A-2)/(C)" of 95/5, and the resultant is subjected to injection molding to provide a flat plate having a thickness of 2 mm. A photograph is obtained by observing the flat plate with the transmission electron microscope, and the number average of the diameters of 100 particles in the photograph is calculated.

As a commercial product of the MBS, there may be given, for example, "METABLEN C223A" (manufactured by Mitsubishi Rayon Co., Ltd.), "DENKA TH Polymer" (manufactured by Denka Company Limited), "KANE ACE B" (manufactured by Kaneka Corporation), and "PARALOID EXL2620" (manufactured by The Dow Chemical Company). As a commercial product of the MABS, there may be given, for example, "DENKA CL Polymer", "DENKA TE Polymer", and "DENKA TP Polymer" (all of which are manufactured by Denka Company Limited). As a commercial product of the MB, there may be given, for example, "KANE ACE M-711" (manufactured by Kaneka Corporation) and "PARALOID EXL2603" and "PARALOID EXL2690" (each of which is manufactured by The Dow Chemical Company).

Here, in the polycarbonate resin composition of the present invention, preferred contents of the component (B) (the component (B-1) and the component (B-2)) and the component (C) with respect to 100 parts by mass of the component (A) are as described below. When the contents of the respective components fall within the following ranges, the balance between the fluidity and the impact resistance becomes more satisfactory.

In the polycarbonate resin composition of the present invention, it is preferred that the content of the component (B) be from 8 parts by mass to 100 parts by mass and the content of the component (C) be from 1 part by mass to 8 parts by mass with respect to 100 parts by mass of the component (A). It is more preferred that the content of the component (B) be from 8 parts by mass to 70 parts by mass and the content of the component (C) be from 1 part by mass to 6 parts by mass.

In the polycarbonate resin composition of the present invention, it is preferred that the content of the component (B-1) be from 8 parts by mass to 100 parts by mass, the content of the component (B-2) be 20 parts by mass or less, and the content of the component (C) be from 1 part by mass to 8 parts by mass with respect to 100 parts by mass of the component (A). It is more preferred that the content of the component (B-1) be from 8 parts by mass to 50 parts by mass, the content of the component (B-2) be from 1 part by mass to 20 parts by mass, and the content of the component (C) be from 1 part by mass to 6 parts by mass. In addition, when the content of the constituent unit derived from butadiene in the component (B-1) is from 30 mass % to 70 mass %, the contents are preferably as follows: the content of the component (B-1) is from 8 parts by mass to 15 parts by mass, the content of the component (B-2) is from 10 parts by mass to 25 parts by mass, and the content of the component (C) is from 1 part by mass to 6 parts by mass with respect to 100 parts by mass of the component (A).

In the polycarbonate resin composition of the present invention, the content of the polyorganosiloxane block moiety containing the repeating unit represented by the general formula (II) is from 0.1 mass % to 10 mass %, preferably from 0.5 mass % to 8.0 mass %, more preferably from 0.70 mass % to 5.0 mass % in the entire resin composition.

In the case where the content is less than 0.1 mass %, the impact strength of a molded body to be obtained is insufficient. In addition, the case where the content is 10 mass % or less is preferred in terms of economic efficiency.

Here, the content and chain length of the polyorganosiloxane block moiety in the resin composition are values calculated by nuclear magnetic resonance (NMR) measurement.

In addition, the polycarbonate resin composition of the present invention is such that the content of the constituent unit derived from butadiene in the entire resin composition is from 3 mass % to 10 mass %. When the content of the constituent unit derived from butadiene is less than 3 mass %, the impact resistance of the molded body is insufficient, and when the content is more than 10 mass %, reductions in fluidity and flame retardancy thereof occur. From the above-mentioned viewpoint, the polycarbonate resin composition of the present invention is such that the content of the constituent unit derived from the butadiene in the entire resin composition is preferably from 3 mass % to 8 mass %, more preferably from 3.5 mass % to 6 mass %.

Further, the polycarbonate resin composition of the present invention is such that the content of the constituent unit derived from the styrene in the entire resin composition is preferably from 5 mass % to 35 mass %, and the content of the constituent unit derived from the acrylonitrile therein is preferably from 3 mass % to 10 mass %. When the content of the constituent unit derived from styrene is 5 mass % or more, the fluidity becomes more satisfactory, and when the content is 35 mass % or less, a reduction in impact resistance of the molded body is easily avoided. In addition, when the content of the constituent unit derived from acrylonitrile is 3 mass % or more, the compatibility with the component (A) becomes more satisfactory, and when the content is 10 mass % or less, the reduction in impact resistance of the molded body can be easily avoided.

From the above-mentioned viewpoint, the content of the constituent unit derived from the styrene in the polycarbonate resin composition of the present invention is more preferably from 7 mass % to 20 mass %, still more preferably from 8 mass % to 15 mass %. In addition, the content of the constituent unit derived from the acrylonitrile is more preferably from 3 mass % to 8 mass %, still more preferably from 3 mass % to 6 mass %.

Further, the polycarbonate resin composition of the present invention has the following feature: the total of the content of the constituent unit derived from the styrene and the content of the constituent unit derived from acrylonitrile in the entire resin composition is from 8 mass % to 45 mass %. When the total of the content of the constituent unit derived from styrene and the content of the constituent unit derived from the acrylonitrile is from 8 mass % to 45 mass %, the fluidity becomes satisfactory, and a reduction in impact resistance of the molded body can be easily avoided.

From the above-mentioned viewpoint, the total of the content of the constituent unit derived from the styrene and the content of the constituent unit derived from the acrylonitrile in the polycarbonate resin composition of the present invention is more preferably from 8 mass % to 30 mass %, still more preferably from 10 mass % to 25 mass %.

In the polycarbonate resin composition of the present invention, the total content of the polyorganosiloxane block moiety containing the repeating unit represented by the general formula (II) and the constituent unit derived from butadiene is preferably from 3.5 mass % to 15 mass %, more preferably from 4.0 mass % to 10 mass %. Each of the polyorganosiloxane block moiety and the constituent unit derived from butadiene improves the impact resistance of the resin composition. Accordingly, when the total content is 3.5 mass % or more, higher impact resistance can be obtained. In addition, when the total content is 15 mass % or less, a reduction in fluidity thereof can be further suppressed.

[Flame Retardant (D)]

It is preferred that the polycarbonate resin composition of the present invention further contain, as the component (D), the flame retardant.

The flame retardant is not particularly limited as long as the flame retardant has an improving effect on the flame retardancy of the resin composition within the scope of the effects of the present invention, and examples thereof include various known flame retardants, such as a phosphorus-based flame retardant, a halogen-based flame retardant, and a metal salt-based flame retardant. Among those various known flame retardants, a phosphorus-based flame retardant is preferably used as the component (D) from the viewpoint that high flame retardancy is imparted to the resin composition.

Examples of the phosphorus-based flame retardant include red phosphorus- and phosphate-based flame retardants.

In particular, the phosphate-based flame retardant is preferably a halogen-free flame retardant. An example thereof is a halogen-free flame retardant formed of a monomer, an oligomer, or a polymer of a phosphate or a mixture thereof. Specific examples thereof include trimethyl phosphate, triethyl phosphate, tributyl phosphate, trioctyl phosphate, tributoxyethyl phosphate, triphenyl phosphate, tricresyl phosphate, cresyl diphenyl phosphate, octyl diphenyl phosphate, tri(2-ethylhexyl) phosphate, diisopropyl phenyl phosphate, trixylenyl phosphate, tris(isopropylphenyl) phosphate, trinaphthyl phosphate, bisphenol A bisphosphate, hydroquinone bisphosphate, resorcin bisphosphate, resorcinol-diphenyl phosphate, and trioxybenzene triphosphate as well as substituted products and condensed products thereof. Among them, a condensed phosphate is preferably used.

As a commercial phosphate compound that may be suitably used as the phosphate-based flame retardant, there may be given, for example, "TPP" [triphenyl phosphate], "TXP" [trixylenyl phosphate], "CR733S" [resorcinol bis(diphenyl phosphate)], "CR741" [bisphenol A bis(diphenyl phosphate)], "PX200" [1,3-phenylene-tetrakis(2,6-dimethylphenyl) phosphate], "PX201L" [1,4-phenylene-tetrakis(2,6-dimethylphenyl) phosphate], and "PX202" [4,4'-biphenylene-tetrakis(2,6-dimethylphenyl) phosphate] manufactured by Daihachi Chemical Industry Co., Ltd.

The phosphate-based flame retardant is obtained by a reaction among a dihydric phenol, a monohydric phenol represented by Ar.OH, and phosphorus oxychloride.

One of those flame retardants may be used alone, or two or more thereof may be used in combination.

The content of the component (D) in the polycarbonate resin composition of the present invention is preferably from 10 parts by mass to 40 parts by mass, more preferably from 10 parts by mass to 30 parts by mass, still more preferably from 15 parts by mass to 30 parts by mass with respect to 100 parts by mass of the component (A). When the content is 10 parts by mass or more, more satisfactory flame retardancy is obtained and the fluidity of the resin composition is further improved. In addition, when the content is 40 parts by mass or less, the impact resistance and heat resistance of the resin composition are easily maintained.

[Other Component]

Any other component can be appropriately incorporated into the polycarbonate resin composition of the present invention to the extent that the effects of the present invention are not remarkably impaired.

Examples of the other component include additives such as an antioxidant, a UV absorber, a release agent, a flame retardant aid, an inorganic filler, and a colorant (a dye or a pigment).

Examples of the antioxidant include a phosphorus-based antioxidant, a sulfur-based antioxidant, and a phenol-based antioxidant.

The phosphorus-based antioxidant is not particularly limited. Typical examples thereof include tris(nonylphenyl) phosphite and 2-ethylhexyl diphenyl phosphite as well as a trialkyl phosphite, a tricycloalkyl phosphite, a triaryl phosphite, a trialkyl phosphate, a tricycloalkyl phosphate, and a triaryl phosphate. Among them, a triaryl phosphite or a triaryl phosphate is suitably used.

The sulfur-based antioxidant is not particularly limited, and is preferably pentaerythritol tetrakis(3-laurylthiopropionate) or tetrakis[methylene-3-(dodecylthio)propionate] methane.

The phenol-based antioxidant is not particularly limited. Hindered phenol-based antioxidants are suitably used. Among them, octadecyl 3-(3,5-di-tert-butyl-4-hydroxyphenyl)propionate, pentaerythritol-tetrakis[3-(3,5-di-t-butyl-4-hydroxyphenyl)propionate], 1,6-hexanediol-bis[3-(3,5-di-tert-butyl-4-hydroxyphenyl)propionate], 1,3,5-trimethyl-2,4,6-tris(3,5-di-tert-butyl-4-hydroxybenzyl)benzene, or the like is preferred.

In the present invention, when any of the antioxidants is used, one of the antioxidants may be used alone, or two or more thereof may be used in combination. The phosphorus-based antioxidant is preferably used as the antioxidant. It is more preferred that the phosphorus-based antioxidant be used alone, or the phosphorus-based antioxidant and the sulfur-based antioxidant and/or the phenol-based antioxidant be used in combination.

The blending amount of the antioxidant is preferably from 0.001 part by mass to 5 parts by mass, more preferably from 0.005 part by mass to 3 parts by mass, still more preferably from 0.01 part by mass to 1 part by mass with respect to 100 parts by mass of the component (A). When the blending amount of the antioxidant falls within the range, the discoloration of the resin composition and a reduction in molecular weight thereof at the time of its molding can be sufficiently prevented, and its antioxidant effect can be improved.

For example, the following UV absorber may be used: a benzophenone-based, benzotriazole-based, hydroxyphenyltriazine-based, cyclic imino ester-based, or cyanoacrylate-based UV absorber. One of the UV absorbers may be used alone, or two or more thereof may be used in combination. As the UV absorber, at least one kind selected from a benzophenone-based UV absorber and a benzotriazole-based UV absorber is preferably used, and a benzotriazole-based UV absorber is more preferably used.

Examples of the benzophenone-based UV absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxy trihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone.

Examples of the benzotriazole-based UV absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), and 2-[2-hydroxy-3-(3,4,5,6-tetrahydrophthalimidemethyl)-5-methylphenyl] benzotriazole as well as polymers each having a 2-hydroxyphenyl-2H-benzotriazole skeleton, such as a copolymer of 2-(2'-hydroxy-5-methacryloxyethylphenyl)-2H-benzotriazole and a vinyl-based monomer copolymerizable with the monomer and a copolymer of 2-(2'-hydroxy-5-acryloxyethylphenyl)-2H-benzotriazole and a vinyl-based monomer copolymerizable with the monomer.

The blending amount of the UV absorber in the polycarbonate resin composition of the present invention is preferably from 0.001 part by mass to 1 part by mass, more preferably from 0.005 part by mass to 0.7 part by mass, still more preferably from 0.01 part by mass to 0.5 part by mass with respect to 100 parts by mass of the component (A). In the case where the blending amount of the UV absorber is 0.001 part by mass or more, the occurrence of the coloring of the molded body, such as yellowing, can be sufficiently suppressed. In addition, the case where the blending amount is 1 part by mass or less is preferred in terms of economic efficiency, and in this case, the contamination of a mold does not occur at the time of the molding of the resin composition.

For example, a fatty acid ester, polyolefin-based wax, fluorine oil, or paraffin wax may be used as the release agent. Among them, a fatty acid ester is preferred, and preferred examples thereof include: partial esters, such as stearic acid monoglyceride, stearic acid diglyceride, stearic acid monosorbitate, behenic acid monoglyceride, pentaerythritol monostearate, pentaerythritol distearate, propylene glycol monostearate, sorbitan monostearate, and glycerin monostearate; and pentaerythritol tetrastearate. One of those release agents may be used alone, or two or more thereof may be used in combination.

The blending amount of the release agent in the polycarbonate resin composition of the present invention is preferably from 0.01 part by mass to 3 parts by mass, more preferably from 0.1 part by mass to 2 parts by mass, still more preferably from 0.2 part by mass to 2 parts by mass with respect to 100 parts by mass of the component (A).

The flame retardant aid is preferably used together with the flame retardant (D), and a polytetrafluoroethylene (PTFE) or an antimony oxide compound can be used as the aid. Among them, a PTFE is preferably used and a PTFE having a fibril-forming ability is desirably used. Mixed powder formed of PTFE particles and organic polymer particles is also desirably used.

As a monomer for producing the organic polymer particles, there may be specifically given, for example: a styrene-based monomer; an alkyl (meth)acrylate-based monomer; a vinyl cyanide-based monomer; a vinyl ether-based monomer; a vinyl carboxylate-based monomer; an olefin-based monomer; and a diene-based monomer. In particular, an alkyl (meth)acrylate-based monomer is preferably used. The alkyl (meth)acrylate-based monomer refers to both alkyl acrylate-based and alkyl methacrylate-based monomers.

The polymerization of those monomers provides the organic polymer particles. One of the monomers can be used, or two or more thereof can be used as a mixture. The organic polymer particles are preferably particles each formed of an alkyl (meth)acrylate-based copolymer.

The blending amount of the flame retardant aid is preferably from 0.1 part by mass to 2 parts by mass, more preferably from 0.3 part by mass to 1.5 parts by mass with respect to 100 parts by mass of the component (A).

Examples of the inorganic filler may include talc, mica, kaolin, diatomaceous earth, calcium carbonate, calcium sulfate, barium sulfate, glass fibers, carbon fibers, and potassium titanate fibers. Among them, for example, talc and mica, each of which has a plate shape, and fibrous fillers, such as glass fibers and carbon fibers, are preferred. Blending the inorganic filler can further improve the flame retardancy and dimensional stability of the resin composition.

One of those inorganic fillers may be used alone, or two or more thereof may be used in combination.

The blending amount of the inorganic filler is preferably from 0.1 part by mass to 10 parts by mass, more preferably from 0.5 part by mass to 5 parts by mass with respect to 100 parts by mass of the component (A). When the blending amount is 0.1 part by mass or more, improving effects on the flame retardancy and the dimensional stability can be sufficiently obtained. When the blending amount is 10 parts by mass or less, the fluidity and impact resistance of the resin composition are easily maintained.

Examples of the colorant include dyes such as a perylene-based dye, a coumarin-based dye, a thioindigo-based dye, an anthraquinone-based dye, a thioxanthone-based dye, a ferrocyanide, a perinone-based dye, a quinoline-based dye, and a phthalocyanine-based dye.

<Physical Properties of Polycarbonate Resin Composition>

The polycarbonate resin composition of the present invention is excellent in fluidity. Specifically, the resin composition has a MFR measured at a temperature of 260° C. and a load of 2.16 kg of typically 10 g/10 min or more, preferably 15 g/10 min or more, more preferably 20 g/10 min or more.

An upper limit for the MFR is not particularly limited, but is typically 100 g/10 min or less. The MFR can be measured in conformity with ASTM D1238.

In addition, a Q value and a spiral flow length (SFL) are available as other indicators each representing the fluidity of the resin composition. The polycarbonate resin composition of the present invention is a resin composition having a Q value measured at a temperature of 260° C. and a load of 100 kg of typically 0.10 mL/sec or more, preferably 0.20 mL/sec or more, more preferably 0.25 mL/sec or more. An upper limit for the Q value is not particularly limited, but is typically 1.0 mL/sec or less.

Further, a flow length (SFL) at the time of the molding of the polycarbonate resin composition of the present invention with a spiral flow mold having a cylinder temperature of 240° C., a mold temperature of 40° C., and a thickness of 2.0 mm at a pressure setting of 125 MPa is typically 35 cm or more, preferably 42 cm or more, still more preferably 45 cm or more. The Q value and the SFL can be specifically measured by methods described in Examples.

As described above, the polycarbonate resin composition of the present invention has high fluidity, and hence can be molded into, for example, a thin-walled and large-sized molded body.

The Charpy impact strength of the polycarbonate resin composition of the present invention is as follows: a measured value at a temperature of 23° C. when the composition is molded into a molded body having a thickness of 4 mm is typically 15 kJ/m$^2$ or more, preferably 20 kJ/m$^2$ or more, still more preferably 30 kJ/m$^2$ or more. The Charpy impact strength is measured by using a notched test piece produced from the molded body having a thickness of 4 mm in conformity with ISO 179 at a temperature of 23° C., and can be specifically measured by a method described in Examples.

In addition, in the polycarbonate resin composition of the present invention, it is preferred that flame retardancy under the Underwriters Laboratory Subject 94 (UL94) standard in a molded body thereof having a thickness of 1.5 mm satisfy a 5V rank. In addition, the flame retardancy by an UL94 standard of the polycarbonate resin composition of the present invention when molded into a molded body having a thickness of 1.2 mm preferably satisfies a V-1 rank. The flame retardancy can be measured by a vertical flame test in conformity with the UL94 standard, and can be specifically measured by a method described in Examples.

The polycarbonate resin composition of the present invention is excellent in chemical resistance. The phrase "excellent in chemical resistance" means that the polycarbonate resin composition has resistance that suppresses reductions in physical properties thereof occurring when the composition is brought into contact with a chemical, such as a solvent, an emulsifying agent, an antiseptic, or an oil solution, to low levels. Specifically, the phrase means that external appearance changes, such as cracking, checking, and crazing, are not observed after 200 hours of standing of the composition having applied thereto a specific chemical after the application of a strain of 1.0% by a three-point bending test method.

<Method of Producing Polycarbonate Resin Composition>

Next, a method of producing the polycarbonate resin composition of the present invention is described.

The polycarbonate resin composition of the present invention is obtained by blending the components (A), (B), and (C) and the component (D) to be used as required, and any other general component, and kneading the components. The blending and the kneading at this time can be performed by the following method: the components are preliminarily mixed by using a typically used apparatus, such as a ribbon blender or a drum tumbler, and are then mixed by using, for example, a Henschel mixer, a Banbury mixer, a single screw extruder, a twin screw extruder, a multi-screw extruder, or a co-kneader.

In normal cases, a heating temperature at the time of the kneading is appropriately selected from the range of from 240° C. to 300° C.

The components except the polycarbonate resin (A) can be melt-kneaded with the polycarbonate resin (A) in advance, i.e., can be added as a master batch.

[Molded Body]

A molded body of the present invention contains the polycarbonate resin composition of the present invention.

The molded body of the present invention is obtained as follows: a composition obtained by melt-kneading the polycarbonate resin composition of the present invention with the melt-kneading molding machine, or a pellet obtained from the composition is used as a raw material, and the raw material is molded by, for example, an injection molding method, an injection compression molding method, an extrusion molding method, a blow molding method, a press molding method, a vacuum molding method, or a foam molding method.

The molded body can be particularly suitably obtained by: producing a pellet-shaped molding raw material by the melt-kneading method; and then subjecting the pellet to injection molding or injection compression molding.

A gas injection molding method for the prevention of a sink mark on the external appearance of the molded body or for the weight reduction thereof can also be adopted as an injection molding method.

<Physical Properties of Molded Body>

The molded body of the polycarbonate resin composition of the present invention obtained as described above has the following characteristic values: the bending strength of a test piece having a thickness of 4 mm, which is produced from the molded body, measured in conformity with ISO 178 at 23° C. is typically from 85 MPa to 95 MPa, and the bending modulus thereof is typically from 2,000 MPa to 3,000 MPa.

Each of the characteristic values is specifically measured by a method described in Examples.

The molded body of the present invention is excellent in heat resistance.

The polycarbonate resin composition of the present invention and the molded body containing the resin composition can each be suitably used in, for example, an automobile part (such as an exterior, an interior, or a meter panel), or the housing of electronic equipment or information equipment.

EXAMPLES

The present invention is described in more detail by way of Examples. However, the present invention is by no means limited by these Examples.

(1) Chain Length and Content of Polydimethylsiloxane (PDMS)

The chain length and content of a polydimethylsiloxane were calculated by NMR measurement from the integrated value ratio of a methyl group of the polydimethylsiloxane.

<Quantification Method for Chain Length of Polydimethylsiloxane>

1H-NMR Measurement Conditions

NMR apparatus: ECA500 manufactured by JEOL Resonance Co., Ltd.

Probe: 50TH5AT/FG2

Observed range: −5 ppm to 15 ppm

Observation center: 5 ppm

Pulse repetition time: 9 sec
Pulse width: 45°
NMR sample tube: 5 φ
Sample amount: 30 mg to 40 mg
Solvent: deuterochloroform
Measurement temperature: room temperature
Cumulative number: 256 times
In the Case of Allylphenol-terminated Polydimethylsiloxane
A: an integrated value of a methyl group in a dimethylsiloxane moiety observed around δ−0.02 to δ 0.5
B: an integrated value of a methylene group in allylphenol observed around δ 2.50 to δ 2.75
Chain length of polydimethylsiloxane=(A/6)/(B/4)
In the Case of Eugenol-terminated Polydimethylsiloxane
A: an integrated value of a methyl group in a dimethylsiloxane moiety observed around δ−0.02 to δ 0.5
B: an integrated value of a methylene group in eugenol observed around δ 2.40 to δ 2.70
Chain length of polydimethylsiloxane=(A/6)/(B/4)
    <Quantification Method for Content of Polydimethylsiloxane Block Moiety in PC-PDMS>
e.g.) Quantification method for the copolymerization amount of a polydimethylsiloxane in a p-t-butylphenol (PTBP)-terminated polycarbonate obtained by copolymerizing an allylphenol-terminated polydimethylsiloxane
NMR apparatus: ECA-500 manufactured by JEOL Resonance Co., Ltd.
Probe: TH5 corresponding to 5 φ NMR sample tube
Observed range: −5 ppm to 15 ppm
Observation center: 5 ppm
Pulse repetition time: 9 sec
Pulse width: 45°
Cumulative number: 256 times
NMR sample tube: 5 φ
Solvent: deuterochloroform
Measurement temperature: room temperature
A: an integrated value of a methyl group in a BPA moiety observed around δ 1.5 to δ 1.9
B: an integrated value of a methyl group in a dimethylsiloxane moiety observed around δ−0.02 to δ 0.3
C: an integrated value of a butyl group in a p-tert-butylphenyl moiety observed around δ 1.2 to δ 1.4

$$a=A/6$$

$$b=B/6$$

$$c=C/9$$

$$T=a+b+c$$

$$f=a/T\times 100$$

$$g=b/T\times 100$$

$$h=c/T\times 100$$

$$TW=f\times 254+g\times 74.1+h\times 149$$

$$\text{PDMS (wt \%)}=g\times 74.1/TW\times 100$$

(2) Viscosity-Average Molecular Weights of Polycarbonate-polyorganosiloxane Copolymer and Polycarbonate-Based Resin Composition A viscosity-average molecular weight (Mv) was calculated from the following equation (Schnell's equation) by using a limiting viscosity [η] determined through the measurement of the viscosity of a methylene chloride solution at 20° C. (concentration unit: g/L) with an Ubbelohde-type viscometer.

$$[\eta]=1.23\times 10^{-5}\times Mv^{0.83}$$

Preparation Example 1

<Production of Polycarbonate Oligomer>
Sodium dithionite was added in an amount of 2,000 ppm with respect to bisphenol A (BPA) to be dissolved later to 5.6 mass % aqueous sodium hydroxide, and then BPA was dissolved in the mixture so that the concentration of BPA was 13.5 mass %. Thus, a solution of BPA in aqueous sodium hydroxide was prepared. The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket. The reaction liquid that had exited the tubular reactor was continuously introduced into a baffled vessel type reactor provided with a sweptback blade and having an internal volume of 40 L. The solution of BPA in aqueous sodium hydroxide, 25 mass % aqueous sodium hydroxide, water, and a 1 mass % aqueous solution of triethylamine were further added to the reactor at 2.8 L/hr, 0.07 L/hr, 17 L/hr, and 0.64 L/hr, respectively, to perform a reaction. An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 329 g/L and a chloroformate group concentration of 0.74 mol/L.

Production Example 1

<Production of Polycarbonate-polydimethylsiloxane Copolymer (PC-PDMS Copolymer 1)>
15 L of the polycarbonate oligomer solution produced in Preparation Example 1, 9.0 L of methylene chloride, 384 g of an o-allylphenol terminal-modified polydimethylsiloxane (PDMS) having an average chain length n of polydimethylsiloxane of 90, and 8.8 mL of triethylamine were loaded into a 50 L vessel type reactor provided with a baffle board, a paddle type stirring blade, and a cooling jacket. 1,389 g of 6.4 mass % aqueous sodium hydroxide was added to the mixture under stirring to perform a reaction between the polycarbonate oligomer and the allylphenol terminal-modified PDMS for 10 minutes.

A solution of p-t-butylphenol (PTBP) in methylene chloride (prepared by dissolving 137 g of PTBP in 2.0 L of methylene chloride) and a solution of bisphenol A in aqueous sodium hydroxide (prepared by dissolving 1,012 g of bisphenol A in an aqueous solution prepared by dissolving 577 g of sodium hydroxide and 2.0 g of sodium dithionite in 8.4 L of water) were added to the polymerization liquid to perform a polymerization reaction for 50 minutes.

10 L of methylene chloride was added to the resultant for dilution and then the mixture was stirred for 10 minutes. After that, the mixture was separated into an organic phase containing a polycarbonate-polydimethylsiloxane copolymer (PC-PDMS copolymer), and an aqueous phase containing excess amounts of bisphenol A and sodium hydroxide, and then the organic phase was isolated.

The solution of the PC-PDMS copolymer in methylene chloride thus obtained was sequentially washed with 0.03 mol/L aqueous sodium hydroxide and 0.2 mol/L hydrochloric acid in amounts of 15 vol % each with respect to the solution. Next, the solution was repeatedly washed with pure water until an electric conductivity in an aqueous phase after the washing became 0.01 μS/m or less.

The solution of the PC-PDMS copolymer in methylene chloride obtained by the washing was concentrated and pulverized, and then the resultant flake was dried under reduced pressure at 120° C. Thus, a PC-PDMS copolymer 1 was produced.

The content of the PDMS block moiety of the resultant PC-PDMS copolymer 1 determined by nuclear magnetic resonance (NMR) was 6.0 mass %, and the viscosity number and viscosity-average molecular weight Mv of the copolymer were 47.5 and 17,700, respectively.

Production Example 2

<Production of Polycarbonate-polydimethylsiloxane Copolymer (PC-PDMS Copolymer 2)>

A PC-PDMS copolymer 2 was produced in the same manner as in Production Example 1 except that an o-allylphenol terminal-modified PDMS having an average chain length n of polydimethylsiloxane of 40 was used.

The content of the PDMS block moiety of the resultant PC-PDMS copolymer 2 determined by NMR was 6.0 mass %, and the viscosity number and viscosity-average molecular weight Mv of the copolymer were 47.5 and 17,700, respectively.

The average chain length n of the PDMS of the allylphenol terminal-modified polydimethylsiloxane used in each of the production examples, the usage amount of the PDMS, the usage amount of p-t-butylphenol (PTBP), and the content of the PDMS block moiety, viscosity number, and viscosity-average molecular weight Mv of each of the resultant polycarbonate-polydimethylsiloxane copolymers are shown in Table 1. The viscosity number measured in each of Production Examples of the present invention is a value measured in conformity with ISO 1628-4 (1999).

TABLE 1

|  | Production Example | |
| --- | --- | --- |
|  | 1 | 2 |
| Average chain length n of PDMS | 90 | 40 |
| Usage amount of PDMS (g) | 384 | 384 |
| Usage amount of PTBP (g) | 137 | 137 |
| Content of PDMS block moiety (mass %) | 6.0 | 6.0 |
| Viscosity number | 47.5 | 47.5 |
| Viscosity-average molecular weight Mv | 17,700 | 17,700 |

[Performance Evaluation]
<Fluidity Evaluation>
(MFR)
A MFR at a temperature of 260° C. and a load of 2.16 kg was measured in conformity with ASTM D1238.
(Q Value)
A Q value at a temperature of 260° C. and a load of 100 kg was measured in conformity with JIS K7210 with a Koka flow tester.

(SFL Value)
A flow length (cm) when a pellet obtained in each of the examples was molded with a spiral flow mold having a cylinder temperature of 240° C., a mold temperature of 40° C., and a thickness of 2.0 mm at a pressure setting of 125 MPa was measured.
<Impact Resistance Evaluation>
(Charpy Impact Strength)
A notched test piece was produced from a test piece having a thickness of 4 mm obtained in each of the examples, and its Charpy impact strength was measured in conformity with ISO 179 at a temperature of 23° C. A larger numerical value therefor means that the impact resistance of the test piece is more satisfactory.
<Mechanical Characteristic Evaluation>
(Bending Test)
The bending strength and bending modulus of the test piece having a thickness of 4 mm obtained in each of the examples were measured in conformity with ISO 178 under the conditions of a temperature of 23° C. and a bending rate of 2 mm/min. Larger numerical values for the bending strength and the bending modulus mean that the bending characteristics of the test piece are more satisfactory.
<Heat Resistance Evaluation>
(Heat Deflection Temperature)
The heat deflection temperature (HDT) of the test piece having a thickness of 4 mm obtained in each of the examples was measured in conformity with the measurement method of ISO 75-1,2 at a load of 1.8 MPa. A higher heat deflection temperature means that the heat resistance of the test piece is more satisfactory.
<Flame Retardancy Evaluation>
(UL94 Combustibility)
A test piece having a thickness of 1.5 mm obtained in each example was subjected to a 5V flame test (n=5) in conformity with an Underwriters Laboratory Subject 94 (UL94) vertical flammability test, and the total (seconds) of 5 combustion times was determined. In the flame retardancy evaluation, a test piece that satisfied a 5V rank is represented by "5V", and a test piece that did not satisfy the rank is represented by "5V-OUT".

A test piece having a thickness of 1.2 mm obtained in each example was subjected to a flame test (n=5) in conformity with an Underwriters Laboratory Subject 94 (UL94) vertical flammability test, and the total (seconds) of 5 combustion times was determined. In the flame retardancy evaluation, a test piece that satisfied a V-0 rank is represented by "V-0", a test piece that satisfied a V-1 rank is represented by "V-1", and a test piece that did not satisfy the ranks is represented by "V-OUT".
<Chemical Resistance Evaluation>
(Three-Point Bending Test)
A strain of 1.0% was applied to an ISO dumbbell test piece having a thickness of 4.0 mm obtained in each example by a three-point bending test method. A specific chemical was applied to a site having applied thereto a tensile stress, and the resultant was left to stand at 23° C. for 200 hours. After that, an external appearance change was observed. The test was performed by using samples whose number (n) was 3, and an evaluation was performed in accordance with the following criteria.

Each of the 3 samples is represented as follows: a sample free of any external appearance change is represented by "A", a sample in which crazing occurred is represented by "B", and a sample in which cracking or checking occurred is represented by "C".

The following two kinds of chemicals were used.
"Tellus 68" (Shell Tellus S2 M 68 "hydraulic oil", manufactured by Showa Shell Sekiyu K.K.)
"EP-1" (manufactured by NTN Corporation)

Examples 1 to 5 and Comparative Examples 1 to 10

Respective components were mixed at ratios shown in Table 2, and the mixture was granulated with a vented single screw extruder having a diameter of 50 mm at a resin temperature of 280° C. to provide a pellet formed of a polycarbonate resin composition.

The pellet obtained by the method was subjected to injection molding with an injection molding machine (model number; "IS100EN", manufactured by Toshiba Machine Co., Ltd.) under the molding conditions of a cylinder temperature of 240° C. and a mold temperature of 40° C. to provide a test piece. The foregoing performance evaluations were performed by using the resultant test piece.

Details about the respective components shown in Table 2 used in Examples and Comparative Examples are as described below.

<Polycarbonate-polyorganosiloxane Copolymer (A-0)>
PC-PDMS copolymer 1 (polycarbonate-polydimethylsiloxane copolymer described in Production Example 1)
PC-PDMS copolymer 2 (polycarbonate-polydimethylsiloxane copolymer described in Production Example 2)

<Aromatic Polycarbonate Resin (A-2)>
"TARFLON FN2200" (bisphenol A polycarbonate, manufactured by Idemitsu Kosan Co., Ltd., viscosity number: 56.1, viscosity-average molecular weight Mv=21,500)
"TARFLON FN1900" (bisphenol A polycarbonate, manufactured by Idemitsu Kosan Co., Ltd., viscosity number: 51.0, viscosity-average molecular weight Mv=19,200)
"TARFLON FN1700" (bisphenol A polycarbonate, manufactured by Idemitsu Kosan Co., Ltd., viscosity number: 47.5, viscosity-average molecular weight Mv=17,700)

<Acrylonitrile-butadiene-styrene Terpolymer (B-1)>
"KRALASTIC SXH-330" (acrylonitrile-butadiene-styrene terpolymer (ABS), manufactured by Nippon A&L Inc., content of constituent unit derived from butadiene; 12 mass %)
"SANTAC AT05" (acrylonitrile-butadiene-styrene terpolymer (ABS), manufactured by Nippon A&L Inc., content of constituent unit derived from butadiene; 14 mass %)
"HR181" (acrylonitrile-butadiene-styrene terpolymer (ABS), manufactured by Kumho Petrochemical Co., Ltd., content of constituent unit derived from butadiene; 60 mass %)

<Acrylonitrile-styrene Bipolymer (B-2)>
"S101N" (acrylonitrile-styrene bipolymer (AS), manufactured by UMG ABS, Ltd., MVR [temperature: 200° C., load: 10 kgf]; 95 cm$^3$/10 min)

<Copolymer (C)>
"M-701" (Kane Ace M-701 (MBS), average particle diameter≤500 nm, manufactured by Kaneka Corporation)
"M-711" (Kane Ace M-711 (MB), average particle diameter: 200 nm, manufactured by Kaneka Corporation)
"METABLEN C223A" (methyl methacrylate-butadiene-styrene terpolymer (MBS), average particle diameter: 260 nm, manufactured by Mitsubishi Rayon Co., Ltd.)
"PARALOID EXL2690" (methyl methacrylate-butadiene bipolymer (MB), average particle diameter: 200 nm, manufactured by The Dow Chemical Company)
"PARALOID EXL2603" (methyl methacrylate-butadiene bipolymer (MB), average particle diameter: 200 nm, manufactured by The Dow Chemical Company)

<Flame Retardant (D)>
"CR-741" (aromatic condensed phosphate-based flame retardant, manufactured by Daihachi Chemical Industry Co., Ltd.)

<Flame Retardant Aid>
"Fluon AD939E" (PTFE aqueous dispersion liquid, manufactured by Asahi Glass Co., Ltd.)

Various evaluation results are shown in Table 2.

TABLE 2

| | | | | | Example 1 | Example 2 | Example 3 | Example 4 | Example 5 |
|---|---|---|---|---|---|---|---|---|---|
| Polycarbonate resin composition | (A-1) | PC-PDMS copolymer 1 | Production Example 1 | Part(s) by mass | 12.7 | 25.4 | 25.0 | 0.0 | 12.7 |
| | | PC-PDMS copolymer 2 | Production Example 2 | Part(s) by mass | 0.0 | 0.0 | 0.0 | 25.4 | 0.0 |
| | (A-2) | Aromatic (bisphenol A) PC | FN2200 | Part(s) by mass | 55.6 | 60.3 | 59.4 | 60.3 | 55.6 |
| | | Aromatic (bisphenol A) PC | FN1900 | Part(s) by mass | 31.7 | 14.3 | 15.6 | 14.3 | 31.7 |
| | | Aromatic (bisphenol A) PC | FN1700 | Part(s) by mass | 0.0 | 0.0 | 0.0 | 0.0 | 0.0 |
| | (B-1) | ABS | SXH-330 | Part(s) by mass | 27.0 | 27.0 | 26.6 | 27.0 | 27.0 |
| | | ABS | AT-05 | Part(s) by mass | 0.0 | 0.0 | 0.0 | 0.0 | 0.0 |
| | | ABS | HR181 | Part(s) by mass | 0.0 | 0.0 | 0.0 | 0.0 | 0.0 |
| | (B-2) | AS | S101N | Part(s) by mass | 0.0 | 0.0 | 0.0 | 0.0 | 0.0 |
| | (C) | MBS | M-701 | Part(s) by mass | 0.0 | 0.0 | 0.0 | 0.0 | 0.0 |
| | | MB | M-711 (small particle diameter) | Part(s) by mass | 4.8 | 4.8 | 3.1 | 4.8 | 0.0 |
| | | MBS | C223A | Part(s) by mass | 0.0 | 0.0 | 0.0 | 0.0 | 0.0 |
| | | MB | EXL-2690 (small particle diameter) | Part(s) by mass | 0.0 | 0.0 | 0.0 | 0.0 | 4.8 |
| | | MB | EXL-2603 (small particle diameter) | Part(s) by mass | 0.0 | 0.0 | 0.0 | 0.0 | 0.0 |
| | (D) | Condensed phosphate-based flame retardant | CR741 | Part(s) by mass | 27.0 | 27.0 | 26.6 | 27.0 | 27.0 |
| | Flame retardant aid | PTFE aqueous dispersion liquid | AD939E | Part(s) by mass | 0.8 | 0.8 | 0.8 | 0.8 | 0.8 |
| | Viscosity-average molecular weight (Mv) of component (A) | | | | — | 20,300 | 20,200 | 20,200 | 20,200 | 20,300 |

TABLE 2-continued

|  |  |  |  |  |  |  |  |  |
|---|---|---|---|---|---|---|---|---|
|  | Content (Si) of POS moiety in composition | | mass % | 0.47 | 0.95 | 0.95 | 0.95 | 0.47 |
|  | Content (Si) of POS moiety in component (A) | | mass % | 0.76 | 1.52 | 1.50 | 1.52 | 0.76 |
|  | Content (St) of constituent unit derived from styrene | | mass % | 10.6 | 10.6 | 10.6 | 10.6 | 10.6 |
|  | Content (An) of constituent unit derived from acrylonitrile | | mass % | 4.2 | 4.2 | 4.2 | 4.2 | 4.2 |
|  | Content (Bd) of constituent unit derived from butadiene | | mass % | 4.4 | 4.4 | 3.6 | 4.4 | 4.4 |
|  | Amount of S + AN | | mass % | 14.8 | 14.8 | 14.8 | 14.8 | 14.8 |
| Evaluation result | Fluidity | MFR | 260° C., 2.16 kg | g/10 min | 30 | 28 | 31 | 33 | 28 |
|  |  | Q value | 260° C., 100 kg | $10^{-2}$ mL/s | 28 | 28 | 29 | 30 | 26 |
|  |  | SFL (2 mm) | 240° C. 40° C. 125 MPa | cm | 46 | 45 | 46 | 46 | 45 |
|  | Impact resistance | Charpy impact strength (Ch) | 23° C. | kJ/m$^2$ | 36 | 41 | 30 | 35 | 40 |
|  | Mechanical characteristic | Bending strength | 23° C. | MPa | 92 | 90 | 93 | 90 | 91 |
|  |  | Bending modulus | 23° C. | MPa | 2,620 | 2,600 | 2,670 | 2,600 | 2,610 |
|  |  | Bending modulus | 23° C. | MPa | 2,623 | 2,598 | 2,673 | 2,599 | 2,613 |
|  | Heat resistance | Heat deflection temperature (HDT) | 1.8 MPa | ° C. | 72 | 72 | 73 | 72 | 72 |
|  | Flame retardancy | UL94 flame test 1.5 mm 5 V | Combustion time | Second(s) | 39 | 39 | 42 | 45 | 62 |
|  |  |  | Judgment |  | 5VB | 5VB | 5VB | 5VB | 5VB |
|  |  | UL94 flame test 1.2 mm V test | Combustion time | Second(s) | 5 + 25 = 30 | 5 + 57 = 62 | 5 + 67 = 72 | 5 + 49 = 54 | 5 + 75 = 80 |
|  |  |  | Judgment |  | V-0 | V-1 | V-1 | V-1 | V-1 |
|  | Chemical resistance test: three-point bending test | | Tellus 68 |  | AAA | AAA | AAA | AAA | AAA |
|  |  |  | EP-1 |  | AAA | AAA | AAA | AAA | AAA |

|  |  |  |  |  | Comparative Example 1 | Comparative Example 2 | Comparative Example 3 | Comparative Example 4 | Comparative Example 5 |
|---|---|---|---|---|---|---|---|---|---|
| Polycarbonate resin composition | (A-1) | PC-PDMS copolymer 1 | Production Example 1 | Part(s) by mass | 0.0 | 0.0 | 0.0 | 0.0 | 12.1 |
|  |  | PC-PDMS copolymer 2 | Production Example 2 | Part(s) by mass | 0.0 | 24.6 | 0.0 | 0.0 | 0.0 |
|  | (A-2) | Aromatic (bisphenol A) PC | FN2200 | Part(s) by mass | 50.0 | 50.8 | 50.0 | 50.0 | 50.0 |
|  |  | Aromatic (bisphenol A) PC | FN1900 | Part(s) by mass | 50.0 | 0.0 | 50.0 | 50.0 | 0.0 |
|  |  | Aromatic (bisphenol A) PC | FN1700 | Part(s) by mass | 0.0 | 24.6 | 0.0 | 0.0 | 37.9 |
|  | (B-1) | ABS | SXH-330 | Part(s) by mass | 27.0 | 26.2 | 26.6 | 0.0 | 0.0 |
|  |  | ABS | AT-05 | Part(s) by mass | 0.0 | 0.0 | 0.0 | 0.0 | 0.0 |
|  |  | ABS | HR181 | Part(s) by mass | 0.0 | 0.0 | 0.0 | 10.6 | 10.6 |
|  | (B-2) | AS | S101N | Part(s) by mass | 0.0 | 1.5 | 3.1 | 15.2 | 15.2 |
|  | (C) | MBS | M-701 | Part(s) by mass | 0.0 | 3.1 | 0.0 | 0.0 | 0.0 |
|  |  | MB | M-711 (small particle diameter) | Part(s) by mass | 4.8 | 0.0 | 0.0 | 0.0 | 0.0 |
|  |  | MBS | C223A | Part(s) by mass | 0.0 | 0.0 | 3.1 | 0.0 | 0.0 |
|  |  | MB | EXL-2690 (small particle diameter) | Part(s) by mass | 0.0 | 0.0 | 0.0 | 0.0 | 0.0 |
|  |  | MB | EXL-2603 (small particle diameter) | Part(s) by mass | 0.0 | 0.0 | 0.0 | 3.0 | 3.0 |
|  | (D) | Condensed phosphate-based flame retardant | CR741 | Part(s) by mass | 27.0 | 23.1 | 23.4 | 22.7 | 22.7 |
|  | Flame retardant aid | PTFE aqueous dispersion liquid | AD939E | Part(s) by mass | 0.8 | 0.8 | 0.8 | 0.8 | 0.8 |
|  | Viscosity-average molecular weight (Mv) of component (A) | | | — | 20,400 | 19,600 | 20,400 | 20,400 | 19,600 |
|  | Content (Si) of POS moiety in composition | | | mass % | 0 | 0.95 | 0 | 0 | 0.47 |
|  | Content (Si) of POS moiety in component (A) | | | mass % | 0 | 1.48 | 0 | 0 | 0.73 |
|  | Content (St) of constituent unit derived from styrene | | | mass % | 10.6 | 11.3 | 12.0 | 9.2 | 9.2 |
|  | Content (An) of constituent unit derived from acrylonitrile | | | mass % | 4.2 | 4.4 | 4.7 | 3.4 | 3.4 |
|  | Content (Bd) of constituent unit derived from butadiene | | | mass % | 4.4 | 3.5 | 3.5 | 5.7 | 5.7 |
|  | Amount of S + AN | | | mass % | 14.8 | 15.7 | 16.7 | 12.6 | 12.6 |
| Evaluation result | Fluidity | MFR | 260° C., 2.16 kg | g/10 min | 32 | 30 | 35 | 20 | 28 |
|  |  | Q value | 260° C., 100 kg | $10^{-2}$ mL/s | 28 | 28 | 38 | 38 | 21 |
|  |  | SFL (2 mm) | 240° C. 40° C. 125 MPa | cm | 46 | 45 | 45 | 44 | 46 |
|  | Impact resistance | Charpy impact strength (Ch) | 23° C. | kJ/m$^2$ | 15 | 33 | 13 | 14 | 22 |
|  | Mechanical characteristic | Bending strength | 23° C. | MPa | 93 | 94 | 94 | 92 | 90 |
|  |  | Bending modulus | 23° C. | MPa | 2,670 | 2,690 | 2,620 | 2,520 | 2,500 |
|  |  | Bending modulus | 23° C. | MPa | 2,672 | 2,685 | 2,618 | 2,518 | 2,495 |
|  | Heat resistance | Heat deflection temperature (HDT) | 1.8 MPa | ° C. | 73 | 73 | 77 | 78 | 77 |

TABLE 2-continued

|  |  |  |  |  |  |  |  |  |  |
|---|---|---|---|---|---|---|---|---|---|---|
| Flame retardancy | UL94 flame test 1.5 mm 5 V | Combustion time | Second(s) | 21 | 64 | 41 | 50 | 40 |
|  |  | Judgment |  | 5VB | 5VB | 5 V | 5 V | 5 V |
|  | UL94 flame test 1.2 mm V test | Combustion time | Second(s) | 5 + 16 = 21 | 5 + 103 = 108 | 12 + 39 = 51 | 9 + 54 = 61 | 14 + 68 = 77 |
|  |  | Judgment |  | V-0 | V-1 | V-0 | V-1 | V-1 |
| Chemical resistance test: three-point bending test |  | Tellus 68 |  | AAA | ABC | AAA | AAA | ACC |
|  |  | EP-1 |  | AAA | AAC | AAA | AAA | AAC |

|  |  |  |  |  | Comparative Example 6 | Comparative Example 7 | Comparative Example 8 | Comparative Example 9 | Comparative Example 10 |
|---|---|---|---|---|---|---|---|---|---|
| Polycarbonate resin composition | (A-1) | PC-PDMS copolymer 1 | Production Example 1 | Part(s) by mass | 24.2 | 22.1 | 0.0 | 0.0 | 100.0 |
|  |  | PC-PDMS copolymer 2 | Production Example 2 | Part(s) by mass | 0.0 | 0.0 | 0.0 | 100.0 | 0.0 |
|  | (A-2) | Aromatic (bisphenol A) PC | FN2200 | Part(s) by mass | 48.5 | 48.5 | 0.0 | 0.0 | 0.0 |
|  |  | Aromatic (bisphenol A) PC | FN1900 | Part(s) by mass | 0.0 | 0.0 | 100.0 | 0.0 | 0.0 |
|  |  | Aromatic (bisphenol A) PC | FN1700 | Part(s) by mass | 27.3 | 29.4 | 0.0 | 0.0 | 0.0 |
|  | (B-1) | ABS | SXH-330 | Part(s) by mass | 25.8 | 0.0 | 0.0 | 0.0 | 0.0 |
|  |  | ABS | AT-05 | Part(s) by mass | 0.0 | 0.0 | 100.0 | 100.0 | 100.0 |
|  |  | ABS | HR181 | Part(s) by mass | 0.0 | 10.3 | 0.0 | 0.0 | 0.0 |
|  | (B-2) | AS | S101N | Part(s) by mass | 3.0 | 14.7 | 0.0 | 0.0 | 0.0 |
|  | (C) | MBS | M-701 | Part(s) by mass | 0.0 | 0.0 | 0.0 | 0.0 | 0.0 |
|  |  | MB | M-711 (small particle diameter) | Part(s) by mass | 0.0 | 0.0 | 0.0 | 0.0 | 0.0 |
|  |  | MBS | C223A | Part(s) by mass | 0.0 | 0.0 | 0.0 | 0.0 | 0.0 |
|  |  | MB | EXL-2690 (small particle diameter) | Part(s) by mass | 0.0 | 0.0 | 0.0 | 0.0 | 0.0 |
|  |  | MB | EXL-2603 (small particle diameter) | Part(s) by mass | 0.0 | 0.0 | 0.0 | 0.0 | 0.0 |
|  | (D) | Condensed phosphate-based flame retardant | CR741 | Part(s) by mass | 22.7 | 22.1 | 0.0 | 0.0 | 0.0 |
|  | Flame retardant aid | PTFE aqueous dispersion liquid | AD939E | Part(s) by mass | 0.8 | 0.7 | 0.0 | 0.0 | 0.0 |
|  | Viscosity-average molecular weight (Mv) of component (A) |  |  | — | 19,500 | 19,500 | 19,200 | 17,700 | 17,700 |
|  | Content (Si) of POS moiety in composition |  |  | mass % | 0.95 | 0.89 | 0.0 | 3.0 | 3.0 |
|  | Content (Si) of POS moiety in component (A) |  |  | mass % | 1.45 | 1.32 | 0.0 | 6.0 | 6.0 |
|  | Content (St) of constituent unit derived from styrene |  |  | mass % | 12.0 | 9.2 | 34.9 | 34.9 | 34.9 |
|  | Content (An) of constituent unit derived from acrylonitrile |  |  | mass % | 4.7 | 3.4 | 8.2 | 8.2 | 8.2 |
|  | Content (Bd) of constituent unit derived from butadiene |  |  | mass % | 2.0 | 4.1 | 6.9 | 6.9 | 6.9 |
|  | Amount of S + AN |  |  | mass % | 16.7 | 12.6 | 43.1 | 43.1 | 43.1 |
| Evaluation result | Fluidity | MFR | 260° C., 2.16 kg | g/10 min | 42 | 33 | 20 | 16 | 16 |
|  |  | Q value | 260° C., 100 kg | $10^{-2}$ mL/s | 23 | 21 | 21 | 23 | 21 |
|  |  | SFL (2 mm) | 240° C. 40° C. 125 MPa | cm | 47 | 46 | — | — | — |
|  | Impact resistance | Charpy impact strength (Ch) | 23° C. | kJ/m$^2$ | 10 | 12 | 63 | 70 | 91 |
|  | Mechanical characteristic | Bending strength | 23° C. | MPa | 97 | 93 | 79 | 74 | 71 |
|  |  | Bending modulus | 23° C. | MPa | 2,660 | 2,550 | 2,170 | 2,070 | 2,060 |
|  |  | Bending modulus | 23° C. | MPa | 2,655 | 2,549 | 2,166 | 2,068 | 2,062 |
|  | Heat resistance | Heat deflection temperature (HDT) | 1.8 MPa | ° C. | 77 | 77 | 96 | 92 | 93 |
|  | Flame retardancy | UL94 flame test 1.5 mm 5 V | Combustion time | Second(s) | 40 | 25 | — | — | — |
|  |  |  | Judgment |  | 5 V | 5 V | 5 V-OUT | 5 V-OUT | 5 V-OUT |
|  |  | UL94 flame test 1.2 mm V test | Combustion time | Second(s) | 9 + 29 = 35 | 8 + 38 = 43 | — | — | — |
|  |  |  | Judgment |  | V-0 | V-1 | V-OUT | V-OUT | V-OUT |
|  | Chemical resistance test: three-point bending test |  | Tellus 68 |  | ACC | ACC | CCC | CCC | CCC |
|  |  |  | EP-1 |  | AAC | AAC | BCC | BBC | BBC |

As can be seen from Table 2, the polycarbonate resin composition of the present invention is excellent in fluidity, flame retardancy, impact resistance, and chemical resistance, and its mechanical characteristics and heat resistance are satisfactory.

INDUSTRIAL APPLICABILITY

According to the present invention, there can be provided a polycarbonate resin composition that is excellent in fluidity, flame retardancy, and chemical resistance, and can provide a molded body having a high impact strength. The resin composition is suitably used in, for example, an automobile part (such as an exterior, an interior, or a meter panel), or the housing of electronic equipment or information equipment because the resin composition can be molded into a thin-walled and large-sized molded body.

The invention claimed is:

1. A polycarbonate resin composition, comprising:
   a polycarbonate resin (A) containing
   from 10 mass % to 100 mass % of a polycarbonate-polyorganosiloxane copolymer (A-1) having a polycarbonate block comprising a repeating unit represented by the following general formula (I) and a polyorganosiloxane block comprising a repeating unit represented by the following general formula (II); and
   from 0 mass % to 90 mass % of an aromatic polycarbonate resin (A-2) having a main chain comprising a repeating unit represented by the following general formula (III) and free of a repeating unit represented by the following general formula (II);
   from 26 parts by mass to 50 parts by mass of a copolymer (B) having constituent units derived from acrylonitrile and styrene, and being free of a constituent unit derived from methyl methacrylate with respect to 100 parts by mass of the polycarbonate resin (A); and
   from 1 part by mass to 8 parts by mass of a copolymer (C) having constituent units derived from butadiene and methyl methacrylate with respect to 100 parts by mass of the polycarbonate resin (A); and
   from 10 parts by mass to 40 parts by mass a flame retardant (D) comprising a phosphorus-based flame retardant that comprises a condensed phosphate with respect to 100 parts by mass of the polycarbonate resin (A);
   wherein:
   a content of the polyorganosiloxane block moiety in the entire resin composition is from 0.7 mass % to 10 mass %;
   a total of a content of the constituent unit derived from the acrylonitrile in the entire resin composition and a content of the constituent unit derived from the styrene in the entire resin composition is from 14 mass % to 45 mass %;
   a content of the constituent unit derived from the butadiene in the entire resin composition is from 3 mass % to 10 mass %;
   the polycarbonate resin (A) has a viscosity-average molecular weight (Mv) of from 20,200 to 24,000
   the copolymer (B) is an acrylonitrile-butadiene-styrene terpolymer (B-1), and
   the copolymer (C) is at least one selected from the group consisting of a methyl methacrylate-butadiene-styrene terpolymer and a methyl methacrylate-butadiene bipolymer:

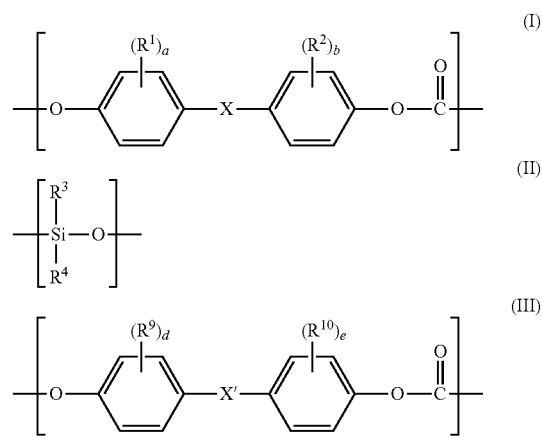

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4; and
wherein the resin composition has a Charpy impact strength of 35 kJ/m$^2$ or more when measured using a notched piece produced from the molded body having a thickness of 4 mm at a temperature of 23° C.

2. The polycarbonate resin composition according to claim 1, wherein a content of the polyorganosiloxane block moiety in the polycarbonate resin (A) is from 0.1 mass % to 15 mass %.

3. The polycarbonate resin composition according to claim 1, wherein the polyorganosiloxane block in the polycarbonate-polyorganosiloxane copolymer (A-1) has a chain length of from 30 to 500.

4. The polycarbonate resin composition according to claim 1, wherein the copolymer (C) has an average particle diameter of from 100 nm to 300 nm.

5. A molded body, comprising the polycarbonate resin composition of claim 1.

6. The polycarbonate resin composition according to claim 1 wherein the resin composition has a MFR of 10 g/10 min or more when measured at a temperature of 260° C. and a load of 2.16 kg.

7. The polycarbonate resin composition according to claim 1 wherein the resin composition has a MFR of 20 g/10 min or more when measured at a temperature of 260° C. and a load of 2.16 kg.

8. The polycarbonate resin composition according to claim 1, wherein the copolymer (C) comprises a methyl methacrylate-butadiene bipolymer.

9. The polycarbonate resin composition according to claim 1, wherein the content of copolymer (B) is from 26.6 parts by mass to 50 parts by mass with respect to 100 parts by mass of the polycarbonate resin (A).

10. The polycarbonate resin composition according to claim 1, wherein the total of a content of the constituent unit derived from the acrylonitrile in the entire resin composition and a content of the constituent unit derived from the styrene in the entire resin composition is from 14.8 mass % to 45 mass %.

11. The polycarbonate resin composition according to claim 1, wherein the resin composition has a spiral flow length of 35 cm or more when molded with a spiral flow mold having a cylinder temperature of 240° C., a mold temperature of 40° C., a thickness of 2.0 mm at a pressure setting of 125 MPa.

12. The polycarbonate resin composition according to claim 1, wherein the resin composition further comprises an additive selected from the group consisting of an antioxidant, a UV absorber, a release agent, a flame retardant aid, an inorganic filler, and a colorant.

13. The polycarbonate resin composition according to claim 11 wherein the spiral flow length is greater than 42 cm.

* * * * *